United States Patent
Lin

(10) Patent No.: US 8,042,028 B2
(45) Date of Patent: Oct. 18, 2011

(54) HS-PDSCH DECODER AND MOBILE RADIO-SIGNAL COMMUNICATION DEVICE INCLUDING THE SAME

(75) Inventor: Hua Lin, Tokyo (JP)

(73) Assignee: NEC Corporation, Tokyo (JP)

( * ) Notice: Subject to any disclaimer, the term of this patent is extended or adjusted under 35 U.S.C. 154(b) by 930 days.

(21) Appl. No.: 11/997,526

(22) PCT Filed: Jul. 31, 2006

(86) PCT No.: PCT/JP2006/315137
§ 371 (c)(1),
(2), (4) Date: Jan. 31, 2008

(87) PCT Pub. No.: WO2007/015455
PCT Pub. Date: Feb. 8, 2007

(65) Prior Publication Data
US 2010/0235722 A1   Sep. 16, 2010

(30) Foreign Application Priority Data

Aug. 1, 2005 (JP) .................................. 2005-222811

(51) Int. Cl.
*H03M 13/03* (2006.01)
(52) U.S. Cl. .................... 714/790; 370/312; 370/342
(58) Field of Classification Search .................. 714/748, 714/790; 370/312, 342
See application file for complete search history.

(56) References Cited

U.S. PATENT DOCUMENTS

| 7,804,811 B2 * | 9/2010 | Murata et al. ................. 370/342 |
| 2008/0181163 A1 * | 7/2008 | Ye et al. ........................ 370/312 |
| 2009/0055702 A1 * | 2/2009 | Kim et al. ..................... 714/748 |

FOREIGN PATENT DOCUMENTS

| JP | 2003234696 A | 8/2003 |
| JP | 2006033157 A | 2/2006 |

OTHER PUBLICATIONS

International Search Report for PCT/JP2006/315137, mailed Sep. 12, 2006.
Miyazaki, Toshiru et al., "HSDPA Kodenso Rate ni Taio shita Kosoku Turbo Fukugo Hoshiki", 2003 Nen IEICE Communications Society Conference Koen Ronbunshu 1, (Sep. 10, 2003) p. 421.
3GPP, 3GPP TS 25.212 V6.5.0, Jun. 2005, pp. 55-58, Internet<URL:http://www.3gpp.ord/ftp/Specs/archive/25_series/25.212/25212-650.zip>.
3GPP TS25.212 V5.3.0 (Release 5) (Dec. 2002) pp. 56-62

* cited by examiner

*Primary Examiner* — Sam Rizk

(57) ABSTRACT

The second rate de-matching unit carries out a second rate de-matching step in parallel to each of two data defining the received data Rx for removing bits having been repeated in a second rate matching step having been carried out in a base station, or de-removing bits having been punctured in the second rate matching step having been carried out in a base station. The adders carry out a combining step in parallel in which data stored in the IR buffer is added to associated data among the two data. The first rate de-matching/turbo-decoding unit carries out a first rate de-matching step in which bits having been punctured in a first rate matching step having been carried out in a base station are repeated to data having been output from the input buffers, and simultaneously, repeatedly carries out a turbo-decoding step to the data.

29 Claims, 13 Drawing Sheets

HS-PDSCH DECODER AND MOBILE RADIO-SIGNAL COMMUNICATION DEVICE INCLUDING THE SAME

BACKGROUND OF THE INVENTION

1. Field of the Invention

The invention relates to a HS-PDSCH (High Speed Physical Downlink Shared Channel) decoder, a method of processing received data in the HS-PDSCH decoder, a mobile radio-signal communication device including the HS-PDSCH, and a computer-readable storage medium storing therein a program for causing a computer to carry out the method of processing received data in the HS-PDSCH decoder.

2. Description of the Related Art

In a W-CDMA (Wideband Code Division Multiple Access) type communication system, a high-speed downlink packet access (HSDPA) function is one of fundamental functions for supporting multi-media service in downlink, and is suggested in the standard release 5 of 3GPP (3rd Generation Partnership Project).

HSDPA is, as indicated with a name thereof, is a function of swiftly transmitting and receiving data between mobile radio-signal communication devices both operating in accordance with 3GPP. The HSDPA function ensures a user a data-transmission speed which was not conventionally accomplished due to limitations of a radio-signal access network. Herein, a radio-signal access network indicates a network through which a mobile radio-signal communication device of a user and a base station can make communication with each other.

The stuff of 3GPP is presently developing a highly reliable HSDPA function having high possibility of being accomplished. If such a HSDPA function is accomplished, it would be possible to ensure an extremely high data transmission rate, specifically, 10 Mbps at greatest, with a band width of 5 MHz or greater in downlink. As a result, it is possible to present highly qualified applications such as video-streaming, a conversation type application, and video on demand.

Fundamental techniques such as AMC (Adaptive Modulation and Coding) and HARQ (Hybrid Automatic Repeat Request) are developed by 3GPP stuffs in order to accomplish the HSDPA function.

In the Adaptive Modulation and Coding, a base station monitors instantaneous quality of a signal received by a mobile radio-signal communication device, automatically selects the best modulation and coding rate in accordance with variation of the monitored quality of a received signal, and transmits data in accordance with the selected modulation and coding rate.

In the Adaptive Modulation and Coding, for instance, when a received signal has good quality, high-speed 16 QAM (16 Quadrature Amplitude Modulation) is selected as a modulation system, whereas when a received signal has poor quality, low-speed QPSK (Quadrature Phase Shift Keying) is selected.

When a received signal has good quality, a coding rate having small forward error collection ability is selected, whereas when a received signal has poor quality, a coding rate having high forward error collection ability is selected in accordance with signal-receiving environment.

Thus, if a received signal has good quality, it is possible to enhance a data transmission efficiency by raising a data transmission rate.

HARQ is a technique comprised of the existing ARQ (error detection and re-transmission function additionally having FEC (Forward Error Collection).

In ARQ, when an error which cannot be collected by ARQ is detected, a request of re-transmitting packets is transmitted to a person who a user presently makes communication to.

In contrast, in HARQ, a forward error collection code is received in advance from a person who a user presently makes communication to, and forward error collection is carried out through the use of the received forward error collection code.

Accordingly, it is possible in HARQ to enhance communication quality and reduce a number of re-transmission of packets from a person who a user presently makes communication to.

Furthermore, in HARQ, in order to enhance a quality of re-transmitted packets, there is carried out a chase/combining step (hereinbelow, referred to as "combining step") in which a packet from which an error was detected, and a re-transmitted packet are combined with each other.

FIG. 9 is a block diagram illustrating a combining step.

It is supposed that an error is detected in a packet 10 transmitted from a base station (transmitter) to a mobile radio-signal communication device (receiver) of a user.

In such a case, the mobile radio-signal communication device of a user transmits a request of re-transmitting the packet, to the base station.

On receipt of the request of re-transmitting the packet from the mobile radio-signal communication device of a user, the base station transmits a packet 11 to the mobile radio-signal communication device of a user.

On receipt of the packet 11, the mobile radio-signal communication device of a user carries out the combining step through the use of an adder 12 for combining the packet 10 in which an error was detected, and the thus re-transmitted packet 11 to each other.

By carrying out the combining step, it is possible in HARQ to reduce errors in re-transmitted packets.

Hereinbelow is explained a HARQ step.

First, a HARQ step to be carried out in a base station (transmitter) is explained with reference to FIG. 10.

FIG. 10 is a block diagram illustrating a structure of a base station carrying out a rate matching step which is a part of a HARQ step.

As illustrated in FIG. 10, a base station is comprised of a turbo-encoding unit 71, a first rate matching unit 72, an IR buffer (Incremental Redundancy buffer) 73, a second rate matching unit 74, and an interleaving/collection unit 75.

The first rate matching unit 72 is comprised of a parity 1 bit processing unit (RM_P1_1) 721 and a parity 2 bit processing unit (RM_P2_1) 722.

The second rate matching unit 74 is comprised of a systematic bit processing unit (RM_S) 741, a parity 1 bit processing unit (RM_P1_2) 742 and a parity 2 bit processing unit (RM_P2_2) 743.

The first rate matching unit 72 receives totally three bit streams, specifically, a bit stream of systematic bits having been encoded by the turbo-encoding unit 71, a bit stream of parity 1 bits, and a bit stream of parity 2 bits.

The first rate matching unit 72 compares a total number of bits (a sum of a number Nsys of systematic bits, a number Np1 of parity 1 bits, and a number Np2 of parity 2 bits) input into the first rate matching unit 72 to a space Nir (Nir=Nsys+Np1+Np2) assigned to the IR buffer 73.

If the total number of bits having been input into the first rate matching unit 72 is equal to or smaller than the space Nir assigned to the IR buffer 73, the bit stream having been input into the first rate matching unit 72

In contrast, if the total number of bits having been input into the first rate matching unit 72 is greater than the space Nir, the parity 1 bit processing unit (RM_P1_1) 721 and the parity 2 bit processing unit (RM_P2_1) 722 puncture bits out of bit streams of the parity 1 bits and the parity 2 bits.

Since a bit stream of the systematic bits is not punctured, a bit stream of the systematic bits passes through the first rate matching unit 72 without being processed.

The above-mentioned removing bits out of bit streams of the parity 1 bits and the parity 2 bits makes a total number of bits output from the first rate matching unit 72 equal to the space Nir assigned to the IR buffer 73.

The second rate matching unit 74 receives the three bit streams through the IR buffer 73 from the first rate matching unit 72.

If a total number of bits (a sum of a number Nsys of systematic bits, a number Np1 of parity 1 bits, and a number Np2 of parity 2 bits) input into the second rate matching unit 74 is greater than a number Ndata (Ndata=Nt,sys+Nt,p1+Nt,p2) of bits of a physical channel available in HS-PDSCH at TTI (transmission time interval), the systematic bit processing unit (RM_S) 741, the parity 1 bit processing unit (RM_P1_2) 742 and the parity 2 bit processing unit (RM_P2_2) 743 puncture bits out of bit streams of the systematic bits, the parity 1 bits, and the parity 2 bits.

If the total number of bits input into the second rate matching unit 74 is smaller than the number Ndata, the systematic bit processing unit (RM_S) 741, the parity 1 bit processing unit (RM_P1_2) 742 and the parity 2 bit processing unit (RM_P2_2) 743 carry out a repetition step in which bits are repeatedly repeated into bit streams of the systematic bits, the parity 1 bits, and the parity 2 bits.

If the total number of bits input into the second rate matching unit 74 is equal to the number Ndata, bit streams of the systematic bits, the parity 1 bits, and the parity 2 bits pass through the second rate matching unit 74 without being processed.

The above-mentioned step of removing bits and repetition step are detailed, for instance, in "3GPP TS25.212 V5.3.0 (Release 5)".

Data to which a second rate matching step was carried out in the second rate matching unit 74 is divided into each of physical channels in the interleaving/collection unit 75, and then, transmitted to a mobile communication device of a receiver.

Hereinbelow is explained a HARQ step to be carried out in a mobile communication device (receiver), with reference to FIG. 11.

FIG. 11 is a block diagram illustrating a structure of a mobile communication device which carries out a rate de-matching step which is a part of a HARQ step.

As illustrated in FIG. 11, the mobile communication device is comprised of a de-interleaving/de-collection unit 85, a second rate de-matching unit 84, an IR buffer 83, a first rate de-matching unit 82, and a turbo-decoding unit 81.

The first rate de-matching unit 82 is comprised of a parity 1 bit processing unit (DRM_P1_1) 821 and a parity 2 bit processing unit (DRM_P2_1) 822.

The second rate de-matching unit 84 is comprised of a systematic bit processing unit (DRM_S) 841, a parity 1 bit processing unit (DRM_P1_2) 842, and a parity 2 bit processing unit (DRM_P2_2) 843.

With reference to FIG. 11, a HARQ step is carried out in the mobile communication device in an order opposite to an order in which a HARQ step is carried out in the base station illustrated in FIG. 10.

The second rate de-matching unit 84 carries out a second rate de-matching step, that is, a step opposite to the second rate matching step carried out in the second rate matching unit 74.

Specifically, the systematic bit processing unit (DRM_S) 841, the parity 1 bit processing unit (DRM_P1_2) 842, and the parity 2 bit processing unit (DRM_P2_2) 843 carry out either a de-repetition step in which bits having been repeated in the second rate matching step in the base station are punctured out of the bit streams having been received from the de-interleaving/de-collection unit 85, or a de-puncturing step in which "0" as a bit having been punctured in the second rate matching step in the base station is added to the bit streams having been received from the de-interleaving/de-collection unit 85.

The first rate de-matching unit 82 carries out a first rate de-matching step, that is, a step opposite to the first rate matching step carried out in the first rate matching unit 72.

Specifically, the parity 1 bit processing unit (DRM_P1_1) 821 and the parity 2 bit processing unit (DRM_P2_1) 822 add "0" as a bit having been punctured in the first rate matching step in the base station, to the bit streams transmitted from the IR buffer 83.

Since a bit is not punctured out of a bit stream of the systematic bits in the first rate matching step, a bit stream of the systematic bits passes through the first rate matching unit 82 without being processed.

Data to which the first rate de-matching step was carried out in the first rate de-matching unit 82 is then decoded in the turbo-decoding unit 81.

Hereinbelow is explained a conventional HS-PDSCH decoder.

FIG. 12 is a block diagram of a conventional HS-PDSCH decoder.

With reference to FIG. 12, a conventional HS-PDSCH decoder is comprised of a received-data buffer 400, a demodulator 401, a de-interleaving/de-collection unit 402, a second rate de-matching unit 403, an adder 404, an IR buffer 405, a first rate de-matching unit 406, an input buffer 407, a turbo-decoder 408, and a selector 410.

The received-data buffer 400 temporarily stores received data Rx comprised of packet data of HS-PDSCH.

The demodulator 401 demodulates data read out of an associated address of the received-data buffer 400.

The de-interleaving/de-collection unit 402 carries out a de-interleaving/de-collection step to data having been demodulated in the demodulator 401.

The second rate de-matching unit 403 carries out a second rate de-matching step in which bits having been repeated in the second rate matching step in the base station are punctured out of data to which the de-interleaving/de-collection step was carried out in the de-interleaving/de-collection unit 402, or bits having been punctured in the second rate matching step in the base station are repeated to data to which the de-interleaving/de-collection step was carried out in the de-interleaving/de-collection unit 402.

The adder 404 carries out a combining step in which an output transmitted from the second rate de-matching unit 403 and an output transmitted from the selector 410 are added to each other.

The IR buffer 405 temporarily stores data to which the combining step was carried out in the adder 404, as data to be added in the next combining step to be carried out in the adder 404. Herein, the IR buffer 405 has a bit width X.

The selector 410 selects one of an output transmitted from the IR buffer 405 and "0", and outputs the selected one to the adder 404.

For instance, if the received data Rx is comprised of newly transmitted packet data, the selector 410 selects and outputs "0", in which case, the adder 404 adds "0" to an output transmitted from the second rate de-matching unit 403. Thus, an output transmitted from the second rate de-matching unit 403 is written into the IR buffer 405 as it is for the preparation of the next combining step.

In contrast, if the received data Rx is comprised of re-transmitted packet data, the selector 410 selects and outputs an output transmitted from the IR buffer 405, in which case, the adder 404 adds packet data stored in an address in the IR buffer 405, but not yet re-transmitted, to an output transmitted from the second rate de-matching unit 403. The result of the addition is written into the address (namely, an address at which data was read out of the IR buffer 405 prior to the addition) in the IR buffer 405 for the preparation of the next combining step.

The first rate de-matching unit 406 carries out a first rate de-matching step in which bits having been punctured in the first rate matching step in the base station are repeated into data output from the IR buffer 405.

The input buffer 407 temporarily stores an output transmitted from the first rate de-matching unit 406 for the preparation of a turbo-decoding step to be carried out in the turbo-decoder 408.

The turbo-decoder 408 repeatedly carries out a turbo-decoding step to data transmitted from the IR buffer 407, and outputs decoding result 409.

Furthermore, the turbo-decoder 408 carries out a CRC (Cyclic Redundancy Check) judgment step based on the decoding result 409. A result (OK or NG) of the CRC judgment is finally reported to the base station through a transmitter (not illustrated).

Hereinbelow is explained an operation of the conventional HS-PDSCH illustrated in FIG. 12, with reference to FIG. 13.

With reference to FIG. 13, an operation of the conventional HS-PDSCH is comprised of a first stage, a second stage, and a third stage. In the first stage, a demodulation step, a de-interleaving step and a de-collection step, a second rate de-matching step, and a combining step are carried out to the data Rx received from the base station, respectively, in the demodulator 401, the de-interleaving/de-collection unit 402, the second rate de-matching unit 403, and the adder 404. The result is stored in the IR buffer 405.

In the second stage, a first rate de-matching step is carried out in the first rate de-matching unit 406 to data transmitted from the IR buffer 405. The result is stored in the input buffer 407.

In the third stage, a turbo-decoding step and a CRC step are carried out in the turbo-decoding unit 408 to data transmitted from the input buffer 407.

The turbo-decoding step is based on an algorithm having a repetitive structure. Accordingly, in each turbo-decoding step, input data is read out of the input buffer 407, and a turbo-decoding step is carried out to the thus read-out data.

As mentioned above, a total period of time necessary for processing received data in the conventional HS-PDSCH decoder is equal to a sum of a period of time necessary for processing received data in the first stage, a period of time necessary for processing received data in the second stage, and a period of time necessary for processing received data in the third stage. Thus, a total period of time necessary for processing received data is generally long.

However, a mobile communication device such as a mobile phone is strictly required to accomplish real-time communication. Accordingly, it is quite important in a mobile communication device mounting a HS-PDSCH decoder thereon to shorten a period of time necessary for processing received data in a HS-PDSCH decoder, and accomplish effective HSDPA functions.

For instance, Japanese Patent Application Publication No. 2002-344358 has suggested a parallel-transmission system for spreading and de-spreading data with pseudorandom noise (PN) codes, and transmitting the data in CDMA, including a transceiver for spreading and transmitting data with different pseudorandom noise codes, and synthesizing the data obtained by de-spreading received signals with the pseudorandom noise codes, and a controller carries out closed-loop control to a number of pseudorandom noise codes with which the data is to be spread or de-spread.

International Publication WO2002/062001 of the international application PCT/JP2001/000675 has suggested a method of simultaneously carrying out both a de-interleaving step and a rate de-matching step to demodulated signals in a receiver receiving radio-signals to which both an interleaving step and a rate matching step were carried out in a transmitter for collecting errors.

Japanese Patent Application Publication No. 2004-349763 has suggested a receiver to be used in a CDMA (Code Division Multiple Access) type mobile communication system, including an arbitrator which, on receipt of transmission formats different from one another in accordance with frames during a transmission period of time of a transmission channel, selecting a transmission format considered most reliable among the received transmission formats, as an arbitration transmission format.

SUMMARY OF THE INVENTION

It is an exemplary object of the present invention to provide a HS-PDSCH decoder, a method of processing received data in the HS-PDSCH decoder, a mobile radio-signal communication device including the HS-PDSCH, and a computer-readable storage medium storing therein a program for causing a computer to carry out the method of processing received data in the HS-PDSCH decoder, all of which are capable of shortening a period of time necessary for processing received data.

In order to achieve the above-mentioned object, the present invention provides, as a first exemplary aspect, a HS-PDSCH decoder for processing received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a second rate de-matching unit receiving in parallel N (N indicates an integer equal to or greater than 2) data defining the received data, carrying out a second rate de-matching step to the N data in parallel for removing bits having been repeated in the second rate matching step or de-removing bits having been punctured in the second rate matching step, and outputting the N data to which the second rate de-matching step was carried out, N adders carrying out a combining step for adding predetermined data to corresponding single data in parallel among the N data having been output from the second rate de-matching unit, and outputting data to which the combining step was carried out, a first rate de-matching unit carrying out a first rate de-matching step to data having been output from the N adders for de-removing bits having been punctured in the first rate matching step, and outputting data to which the first rate de-matching step was carried out, and a decoder repeatedly carrying out a turbo-decoding step to data having been output from the first rate de-matching unit.

In the HS-PDSCH decoder in accordance with the first exemplary aspect of the present invention, since the second rate de-matching step and the combining step are carried out in parallel to N data comprised of the received data, a period of time for carrying out the second rate de-matching step and the combining step is 1/N smaller than the same in a conventional HS-PDSCH decoder in which a second rate de-matching step and a combining step are separately carried out. Thus, it is possible to significantly shorten a period of time necessary for entirely processing received data in the HS-PDSCH decoder.

The present invention provides, as a second exemplary aspect, a HS-PDSCH decoder for processing received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a second rate de-matching unit receiving in parallel N (N indicates an integer equal to or greater than 2) data defining the received data, carrying out a second rate de-matching step to the N data in parallel for removing bits having been repeated in the second rate matching step or de-removing bits having been punctured in the second rate matching step, and outputting the N data to which the second rate de-matching step was carried out, N adders carrying out a combining step for adding predetermined data to corresponding single data in parallel among the N data having been output from the second rate de-matching unit, and outputting data to which the combining step was carried out, N input buffers each associated with each of the N adders, each temporarily storing and outputting data having been output from an associated adder among the N adders, and a first rate de-matching/decoding unit both carrying out a first rate de-matching step to data having been output from the N input buffers for de-removing bits having been punctured in the first rate matching step, and repeatedly carrying out a turbo-decoding step to the data having been output from the N input buffers.

The HS-PDSCH decoder in accordance with the second exemplary aspect of the present invention makes it possible to significantly shorten a period of time necessary for carrying out the second rate de-matching step and the combining step, and further, significantly shorten a period of time necessary for carrying out the first rate de-matching step and the turbo-decoding step. Thus, it is possible to significantly shorten a period of time necessary for entirely processing received data in the HS-PDSCH decoder.

The present invention provides, as a third exemplary aspect, a HS-PDSCH decoder for processing received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a second rate de-matching unit carrying out a second rate de-matching step to the received data for removing bits having been repeated in the second rate matching step or de-removing bits having been punctured in the second rate matching step, and outputting the received data to which the second rate de-matching step was carried out, an adder carrying out a combining step for adding predetermined data to data having been output from the second rate de-matching unit, and outputting data to which the combining step was carried out, an input buffer temporarily storing and outputting data having been output from the adder, and a first rate de-matching/decoding unit both carrying out a first rate de-matching step to data having been output from the input buffer for de-removing bits having been punctured in the first rate matching step, and repeatedly carrying out a turbo-decoding step to the data having been output from the input buffer.

In the HS-PDSCH decoder in accordance with the third exemplary aspect of the present invention, since the first rate de-matching step and the turbo-decoding step are simultaneously carried out, a period of time for carrying out the first rate de-matching step and the turbo-decoding step can be significantly shortened relative to a conventional HS-PDSCH decoder in which a first rate de-matching step and a turbo-decoding step are separately carried out. Thus, it is possible to significantly shorten a period of time necessary for entirely processing received data in the HS-PDSCH decoder.

In the HS-PDSCH decoder in accordance with the third exemplary aspect of the present invention, the first rate de-matching/decoding unit may be comprised of a de-puncturing unit for outputting bits to be repeated into data having been output the input buffer, a de-matching calculating unit for calculating and outputting a de-matching position indicating a position at which bits having been output from the de-puncturing unit are repeated in a first turbo-decoding step into data having been output from the input buffer, a de-matching position storing unit for storing and outputting the de-matching position having been calculated by the de-matching calculating unit, a selector for selecting an output transmitted from the de-matching calculating unit in a first turbo-decoding step and selecting an output transmitted from the de-matching position storing unit in a second or subsequent turbo-decoding step, and outputting the selected output as a control signal for controlling both a data output transmitted from the input buffer and a bit output transmitted from the de-puncturing unit, and a turbo-decoding unit for carrying out a first rate de-matching step in which bits having been output from the de-puncturing unit are repeated into data having been output from the input buffer, and repeatedly carrying out a turbo-decoding step.

As an alternative, in the HS-PDSCH decoder in accordance with the third exemplary aspect of the present invention, the first rate de-matching/decoding unit may be comprised of a de-puncturing unit for outputting bits to be repeated into data having been output the input buffer, a de-matching calculating unit for calculating a de-matching position indicating a position at which bits having been output from the de-puncturing unit are repeated into data having been output from the input buffer, and outputting the calculated de-matching position as a control signal for controlling both outputting the data transmitted from the input buffer and outputting the bits transmitted from the de-puncturing unit, and a turbo-decoding unit for carrying out a first rate de-matching step in which bits having been output from the de-puncturing unit are repeated into data having been output from the input buffer, and repeatedly carrying out a turbo-decoding step.

In the HS-PDSCH decoder in accordance with the second exemplary aspect of the present invention, the first rate de-matching/decoding unit may be comprised of a de-puncturing unit for outputting bits to be repeated into data having been output the N input buffers, a de-matching calculating unit for calculating and outputting a de-matching position indicating a position at which bits having been output from the de-puncturing unit are repeated in a first turbo-decoding step into data having been output from the N input buffers, a de-matching position storing unit for storing and outputting the de-matching position having been calculated by the de-matching calculating unit, a selector for selecting an output transmitted from the de-matching calculating unit in a first turbo-decoding step and selecting an output transmitted from the de-matching position storing unit in a second or subsequent turbo-decoding step, and outputting the selected output as a control signal for controlling both a data output transmitted from the N input buffers and a bit output transmitted from the de-puncturing unit, and a turbo-decoding unit for carrying out a first rate de-matching step in which bits having been output from the de-puncturing unit are repeated into data having been output from the N input buffers, and repeatedly carrying out a turbo-decoding step.

In the HS-PDSCH decoder in accordance with the second exemplary aspect of the present invention, the first rate de-matching/decoding unit may be comprised of a de-puncturing unit for outputting bits to be repeated into data having been output the N input buffers, a de-matching calculating unit for calculating a de-matching position indicating a position at which bits having been output from the de-puncturing unit are repeated into data having been output from the N input buffers, and outputting the calculated de-matching position as a control signal for controlling both a data output transmitted from the N input buffers and a bit output transmitted from the de-puncturing unit, and a turbo-decoding unit for carrying out a first rate de-matching step in which bits having been output from the de-puncturing unit are repeated into data having been output from the N input buffers, and repeatedly carrying out a turbo-decoding step.

The HS-PDSCH decoder in accordance with the first or second exemplary aspect of the present invention may further include N received-data buffers for temporarily storing and outputting the received data, N demodulators each associated with each of the N received-data buffers, each demodulating data having been output from an associated received-data buffer among the N received-data buffers, and outputting the thus demodulated data, and N de-interleaving/de-collection units each associated with each of the N demodulators, each carrying out a de-interleaving/de-collecting step to data having been output from an associated demodulator among the N demodulators, and outputting to which the de-interleaving/de-collecting step was carried out to the second rate de-matching unit.

The HS-PDSCH decoder in accordance with the first or second exemplary aspect of the present invention may further include an IR buffer temporarily storing and outputting data having been output from each of the N adders as the predetermined data to be added in a next combining step in the N adders.

For instance, the above-mentioned HS-PDSCH decoder may be mounted in a mobile radio-signal communication device. A mobile radio-signal communication device comprises a mobile telephone, for instance.

The present invention provides, as a fourth exemplary aspect, a method of dealing in a HS-PDSCH decoder with received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a first step of receiving in parallel N (N indicates an integer equal to or greater than 2) data defining the received data, and carrying out a second rate de-matching step to the N data in parallel for removing bits having been repeated in the second rate matching step or de-removing bits having been punctured in the second rate matching step, a second step of carrying out a combining step for adding predetermined data to corresponding single data in parallel among the N data to which the second rate de-matching step was carried out, a third step of carrying out a first rate de-matching step to data to which the combining step was carried out for de-removing bits having been punctured in the first rate matching step, and a fourth step of repeatedly carrying out a turbo-decoding step to data to which the first rate de-matching step was carried out.

The method in accordance with the fourth exemplary aspect of the present invention provides the same advantages as those provided by the HS-PDSCH decoder in accordance with the first exemplary aspect of the present invention.

The present invention provides, as a fifth exemplary aspect, a method of dealing in a HS-PDSCH decoder with received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a first step of receiving in parallel N (N indicates an integer equal to or greater than 2) data defining the received data, carrying out a second rate de-matching step to the N data in parallel for removing bits having been repeated in the second rate matching step or de-removing bits having been punctured in the second rate matching step, a second step of carrying out a combining step for adding predetermined data to corresponding single data in parallel among the N data to which the second rate de-matching step was carried out, and a third step of both carrying out a first rate de-matching step to data to which the combining step was carried out for de-removing bits having been punctured in the first rate matching step, and repeatedly carrying out a turbo-decoding step to the data to which the combining step was carried out.

The method in accordance with the fifth exemplary aspect of the present invention provides the same advantages as those provided by the HS-PDSCH decoder in accordance with the second exemplary aspect of the present invention.

The present invention provides, as a sixth exemplary aspect, a method of dealing in a HS-PDSCH decoder with received data to which both a first rate matching step in which bits are punctured in a base station in accordance with a number of bits storable in an IR buffer of the base station, and a second rate matching step in which bits are repeated or punctured in accordance with a number of bits which can be transmitted through HS-PDSCH were carried out, including a first step of carrying out a second rate de-matching step to the received data for removing bits having been repeated in the second rate matching step or de-removing bits having been punctured in the second rate matching step, a second step of carrying out a combining step for adding predetermined data to data to which the second rate de-matching step was carried out, and a third step of both carrying out a first rate de-matching step to data to which the combining step was carried out for de-removing bits having been punctured in the first rate matching step, and repeatedly carrying out a turbo-decoding step to the data to which the combining step was carried out.

The method in accordance with the sixth exemplary aspect of the present invention provides the same advantages as those provided by the HS-PDSCH decoder in accordance with the third exemplary aspect of the present invention.

In the method in accordance with the sixth exemplary aspect of the present invention, the third step may be comprised of a fifth step of outputting bits to be repeated into data to which the combining step was carried out, a sixth step of calculating and outputting a de-matching position indicating a position at which bits having been output in the fifth step are repeated in a first turbo-decoding step into data to which the combining step was carried out, a seventh step of storing and outputting the de-matching position, an eighth step of selecting an output transmitted in the sixth step in a first turbo-decoding step and selecting an output transmitted in the seventh step in a second or subsequent turbo-decoding step, and outputting the selected output as a control signal for controlling both an output transmitted in the sixth step and an output transmitted in the seventh step, and a ninth step of carrying out a first rate de-matching step in which bits having been output in the sixth step are repeated into data having been output in the seventh step, and repeatedly carrying out a turbo-decoding step.

In the method in accordance with the sixth exemplary aspect of the present invention, the third step may be comprised of a fifth step of outputting bits to be repeated into data to which the combining step was carried out, a sixth step of calculating a de-matching position indicating a position at which bits having been output in the fifth step are repeated into data to which the combining step was carried out, and outputting the calculated de-matching position as a control signal for controlling both outputting data to which the combining step was carried out and outputting bits transmitted in the fifth step, and a seventh step of carrying out a first rate de-matching step in which bits having been output in the fifth step are repeated into data to which the combining step was carried out, and repeatedly carrying out a turbo-decoding step.

In the method in accordance with the fifth exemplary aspect of the present invention, the third step may be comprised of a fifth step of outputting bits to be repeated into the N data to which the combining step was carried out, a sixth step of calculating and outputting a de-matching position indicating a position at which bits having been output in the fifth step are repeated in a first turbo-decoding step into the N data, a seventh step of storing and outputting the de-matching position having been calculated in the sixth step, an eighth step of selecting an output transmitted in the sixth step in a first turbo-decoding step and selecting an output transmitted in the seventh step in a second or subsequent turbo-decoding step, and outputting the selected output as a control signal for controlling both outputting the N data and outputting the bits transmitted in the fifth step, and a ninth step of carrying out a first rate de-matching step in which bits having been output in the fifth step are repeated into the N data, and repeatedly carrying out a turbo-decoding step.

In the method in accordance with the fifth exemplary aspect of the present invention, the third step may be comprised of a fifth step of outputting bits to be repeated into the N data to which the combining step was carried out, a sixth step of calculating a de-matching position indicating a position at which bits having been output in the fifth step are repeated into the N data, and outputting the calculated de-matching position as a control signal for controlling both outputting the N data and outputting bits transmitted in the fifth step, and a seventh step of carrying out a first rate de-matching step in which bits having been output in the fifth step are repeated into the N data, and repeatedly carrying out a turbo-decoding step.

The method in accordance with the fourth or fifth exemplary aspect of the present invention may further include dividing the received data into N data, and temporarily storing the N data, demodulating each of the N data, and carrying out a de-interleaving/de-collecting step to each of the thus demodulated N data.

The above-mentioned method of dealing in a HS-PDSCH decoder with received data may be structured as a computer-readable storage medium storing therein a computer program.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

First Exemplary Embodiment

Figure 1:
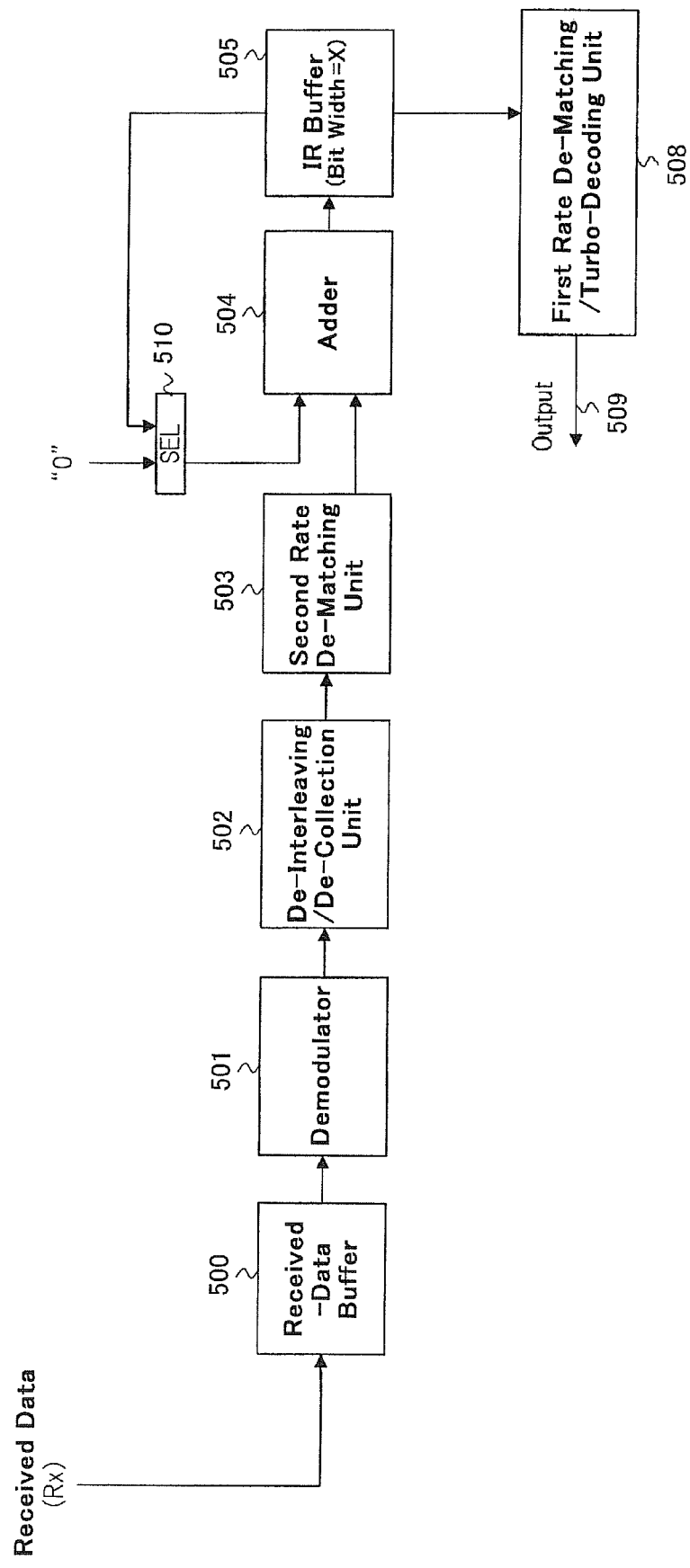
FIG. 1 is a block diagram illustrating a structure of a HS-PDSCH decoder in accordance with a first exemplary embodiment of the present invention.

FIG. 1 is a block diagram of a HS-PDSCH decoder in accordance with a first exemplary embodiment of the present invention.

The HS-PDSCH decoder in accordance with the current embodiment is mounted in a mobile radio-signal communication device, for instance, a mobile telephone.

As illustrated in FIG. 1, the HS-PDSCH decoder in accordance with the first exemplary embodiment is comprised of a received-data buffer 500, a demodulator 501, a de-interleaving/de-collection unit 502, a second rate de-matching unit 503, an adder 504, an IR buffer 505, a first rate de-matching/turbo-decoding unit 508, and a selector 510.

The received-data buffer 500 temporarily stores received data Rx comprised of packet data of HS-PDSCH.

The demodulator 501 demodulates data read out of an associated address of the received-data buffer 500.

The de-interleaving/de-collection unit 502 carries out a de-interleaving/de-collection step to data having been demodulated in the demodulator 501.

The second rate de-matching unit 503 carries out a second rate de-matching step in which bits having been repeated in the second rate matching step in the base station are punctured out of data to which the de-interleaving/de-collection step was carried out in the de-interleaving/de-collection unit 502, or bits having been punctured in the second rate matching step in the base station are repeated to data to which the de-interleaving/de-collection step was carried out in the de-interleaving/de-collection unit 502.

The adder 504 carries out a combining step in which an output transmitted from the second rate de-matching unit 503 and an output transmitted from the selector 510 are added to each other. The IR buffer 505 temporarily stores data to which the combining step was carried out in the adder 504, as data to be added in the next combining step to be carried out in the adder 504. Herein, the IR buffer 505 has a bit width X.

The selector 510 selects one of an output transmitted from the IR buffer 505 and "0", and outputs the selected one to the adder 504.

For instance, if the received data Rx is comprised of newly transmitted packet data, the selector 510 selects and outputs "0", in which case, the adder 504 adds "0" to an output transmitted from the second rate de-matching unit 503. Thus, an output transmitted from the second rate de-matching unit 503 is written into the IR buffer 505 as it is for the preparation of the next combining step.

In contrast, if the received data Rx is comprised of re-transmitted packet data, the selector 510 selects and outputs an output transmitted from the IR buffer 505, in which case, the adder 504 adds packet data stored in an address in the IR buffer 505, but not yet re-transmitted, to an output transmitted from the second rate de-matching unit 503. The result of the addition is written into the address (namely, an address at which data was read out of the IR buffer 505 prior to the addition) in the IR buffer 505 for the preparation of the next combining step.

The first rate de-matching/turbo-decoding unit 508 not only carries out a first rate de-matching step in which bits having been punctured in the first rate matching step in the base station are repeated into data output from the IR buffer 505, but also repeatedly carries out a turbo-decoding step, and outputs a result 509 of the decoding.

Furthermore, the first rate de-matching/turbo-decoding unit 508 carries out a CRC (Cyclic Redundancy Check) judgment step based on the decoding result 509. A result (OK or NG) of the CRC judgment is finally reported to the base station through a transmitter (not illustrated).

Figure 12:
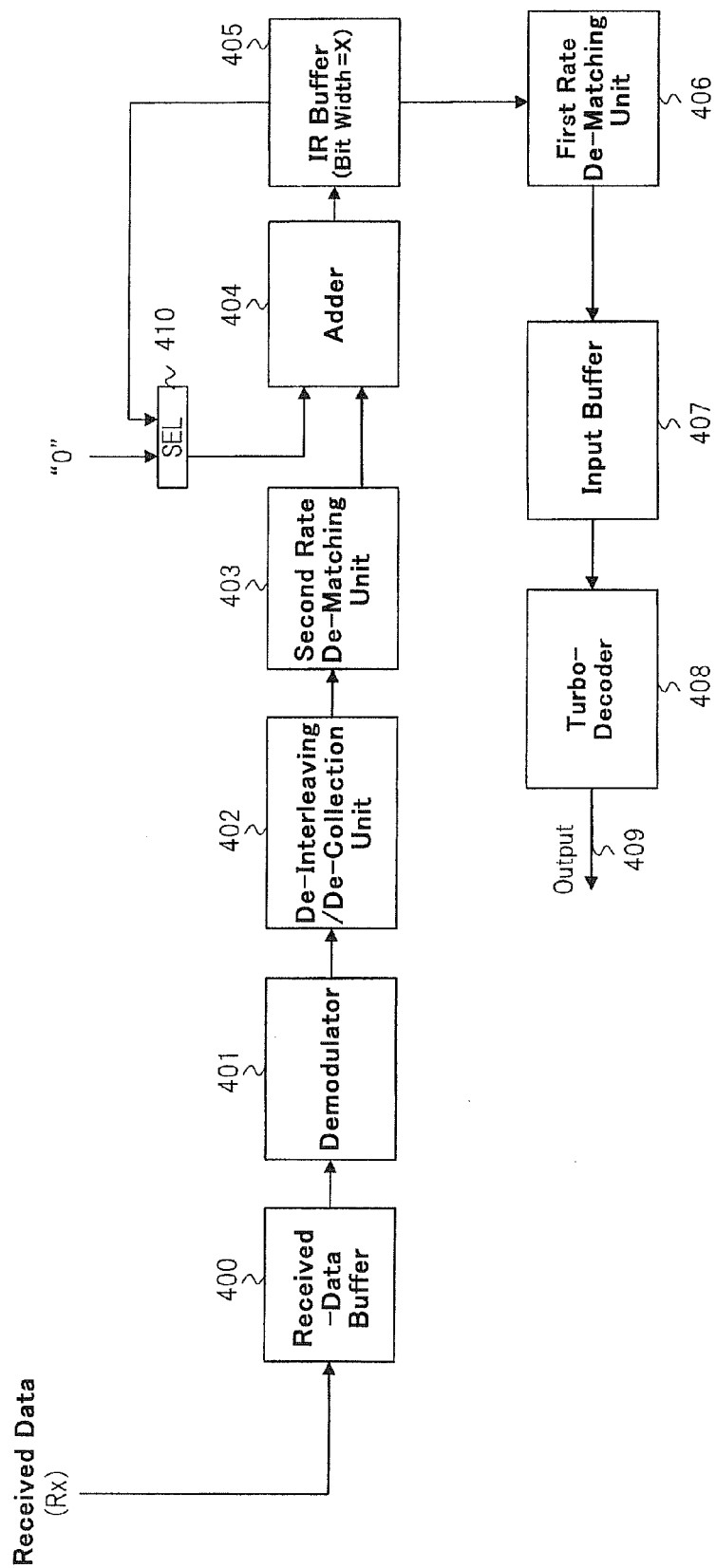
FIG. 12 is a block diagram of a conventional HS-PDSCH decoder.
Figure 13:
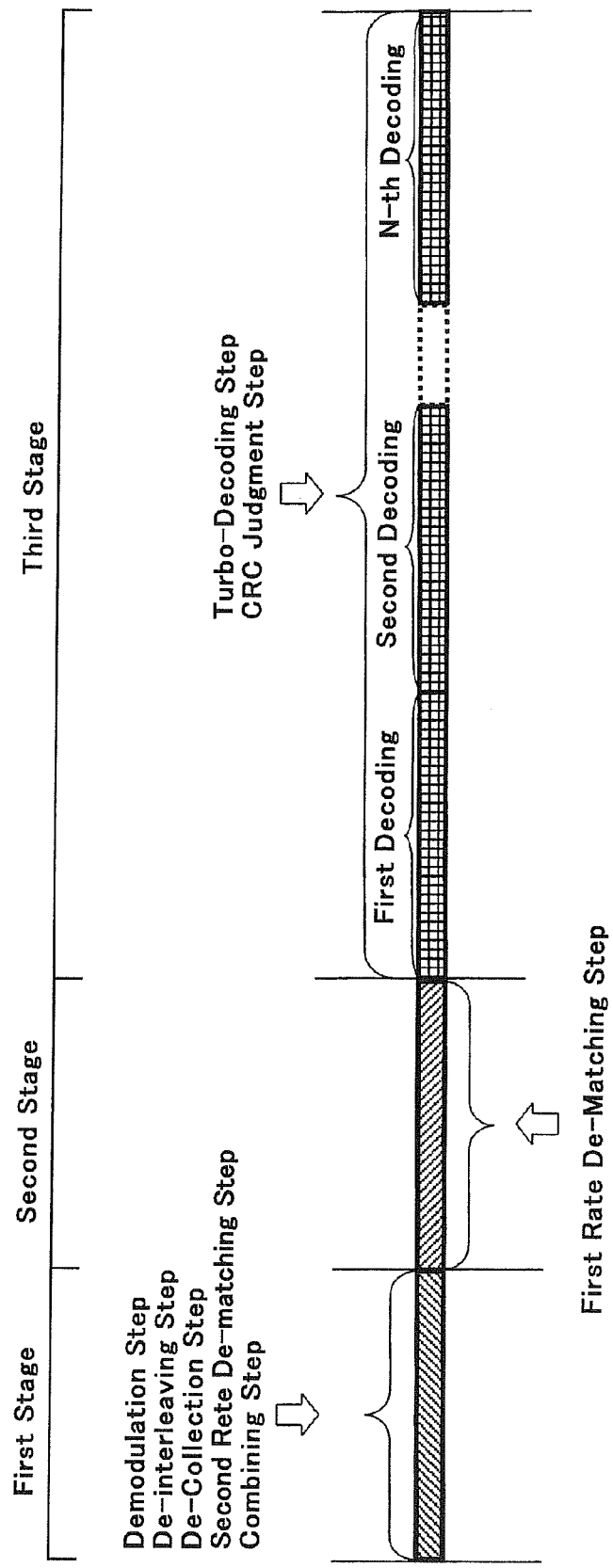
FIG. 13 is used for explaining an operation of a conventional HS-PDSCH decoder.

As illustrated in FIG. 13, an operation of the conventional HS-PDSCH decoder illustrated in FIG. 12 is comprised of three stages, that is, a first stage, a second stage, and a third stage.

In contrast, in an operation of the HS-PDSCH decoder in accordance with the first exemplary embodiment, the second and third stages are simultaneously carried out.

In the HS-PDSCH decoder in accordance with the first exemplary embodiment, a first rate de-matching step and a turbo-decoding step are simultaneously carried out in the first rate de-matching/turbo-decoding unit 508.

In the conventional HS-PDSCH decoder, a first rate de-matching step and a turbo-decoding step are separately carried out. Accordingly, supposing that a period of time necessary for carrying out a first rate de-matching step is indicated as T1, and a period of time necessary for carrying out a turbo-decoding step is indicated as T2, a total period of time necessary for processing received data in the conventional HS-PDSCH decoder is (T1+T2).

In contrast, since a first rate de-matching step and a turbo-decoding step are simultaneously carried out in the HS-PDSCH decoder in accordance with the first exemplary embodiment, a total period of time necessary for processing received data in the HS-PDSCH decoder in accordance with the first exemplary embodiment is equal to T1 or T2 (specifically, if T1 is greater than T2, the total period of time is equal to T1, and if T2 is greater than T1, the total period of time is equal to T2).

As mentioned above, the HS-PDSCH decoder in accordance with the first exemplary embodiment makes it possible to significantly shorten a period of time necessary for carrying out both a first rate de-matching step and a turbo-decoding step, relative to the conventional HS-PDSCH decoder in which those two steps are separately carried out. Accordingly, it is possible to significantly shorten a total period of time necessary for processing received data in a HS-PDSCH decoder.

Second Exemplary Embodiment

Figure 2:
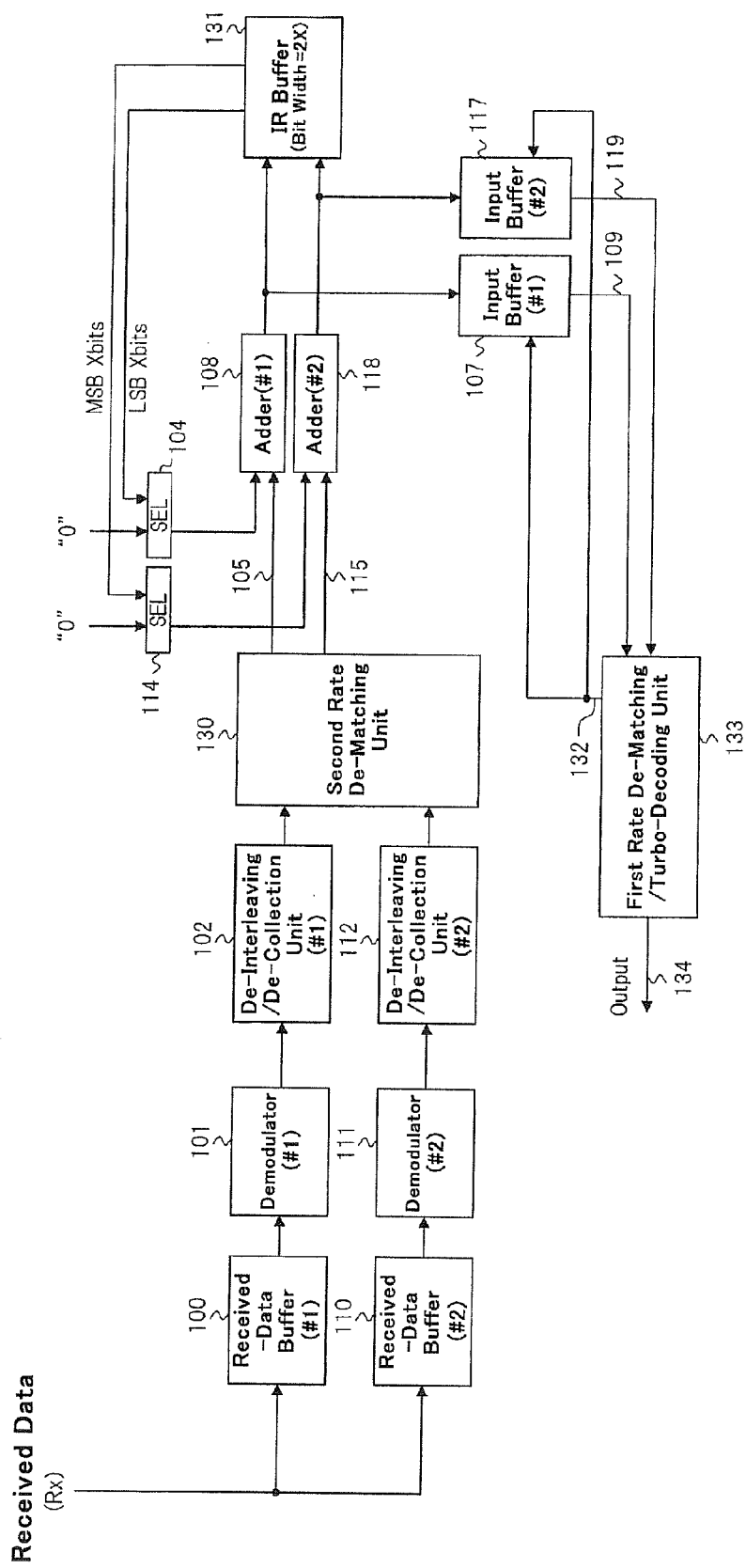
FIG. 2 is a block diagram illustrating a structure of a HS-PDSCH decoder in accordance with a second exemplary embodiment of the present invention.

FIG. 2 is a block diagram of a HS-PDSCH decoder in accordance with a second exemplary embodiment of the present invention.

The HS-PDSCH decoder in accordance with the current embodiment is mounted in a mobile radio-signal communication device, for instance, a mobile telephone.

As illustrated in FIG. 2, the HS-PDSCH decoder in accordance with the second exemplary embodiment is comprised of a first received-data buffer 100, a second received-data buffer 110, a first demodulator 101, a second demodulator 111, a first de-interleaving/de-collection unit 102, a second de-interleaving/de-collection unit 112, a second rate de-matching unit 130, a first adder 108, a second adder 118, an IR buffer 131, a first selector (SEL) 104, a second selector (SEL) 114, a first input buffer 107, a second input buffer 117, and a first rate de-matching/turbo-decoding unit 133.

In the HS-PDSCH decoder in accordance with the second exemplary embodiment, a second rate de-matching step and a combining step are carried out in parallel in the second rate de-matching unit 130, and the first and second adders 108 and 118, and further, a first rate de-matching step and a turbo-decoding step are simultaneously carried out in the first rate de-matching/turbo-decoding unit 133.

Both the first received-data buffer 100 and the second received-data buffer 110 simultaneously, temporarily store received data Rx comprised of packet data of HS-PDSCH.

The first demodulator 101, which is in association with the first received-data buffer 100, demodulates data read out of an associated address of the first received-data buffer 100. The second demodulator 111, which is in association with the second received-data buffer 110, demodulates data read out of an associated address of the second received-data buffer 110.

The first de-interleaving/de-collection unit 102, which is in association with the first demodulator 101, carries out a de-interleaving/de-collection step to data having been demodulated in the first demodulator 101. The second de-interleaving/de-collection unit 112, which is in association with the second demodulator 111, carries out a de-interleaving/de-collection step to data having been demodulated in the second demodulator 111.

The second rate de-matching unit 130 in parallel receives two data to each of which a de-interleaving/de-collection step was carried out in the first de-interleaving/de-collection unit 102 and the second de-interleaving/de-collection unit 112, respectively, and in parallel carries out a second rate de-matching step in which bits having been repeated in the second rate matching step in the base station are punctured out of the two data, or bits having been punctured in the second rate matching step in the base station are repeated to data to the two data.

The second rate matching step was carried out to bit streams of the systematic bits, the parity 1 bits, and the parity 2 bits.

Two data input into the second rate de-matching unit 130 comprises the received data Rx, but are different from each other.

Two data input into the second rate de-matching unit 130 can be differentiated from each other in several ways.

For instance, addresses at which data is read out of the first received-data buffer 100 and the second received-data buffer 110 by the first demodulator 101 and the second demodulator 111, respectively, may be arranged different from each other.

As an alternative, since four demodulated data can be obtained out of the received data Rx in the first and second demodulators 101 and 111, if the modulation is based on 16 QAM, and two demodulated data can be obtained out of the received data Rx in the first and second demodulators 101 and 111, if the modulation is based on QPSK, two demodulated data different from each other may be output among the thus obtained demodulated data.

As an alternative, an order in which the first de-interleaving/de-collection unit 102 outputs data to the second rate de-matching unit 130 may be different from an order in which the second de-interleaving/de-collection unit 112 outputs data to the second rate de-matching unit 130.

The first adder 108 carries out a combining step in which one of outputs transmitted from the second rate de-matching unit 130 and an output transmitted from the first selector 104 are added to each other. The second adder 118 carries out a combining step in which the other output transmitted from the second rate de-matching unit 130 and an output transmitted from the second selector 114 are added to each other.

The first and second adders 108 and 118 carry out the combining step in parallel.

The IR buffer 131 temporarily stores data to which the combining step was carried out in each of the first adder 108 and the second adder 118, as data to be added in the next combining step to be carried out in each of the first adder 108 and the second adder 118.

Since the second rate de-matching step and the combining step are carried out in parallel, a size and a bit width of the IR buffer 131 are changed from the same of an IR buffer of a conventional HS-PDSCH decoder.

For instance, assuming that an IR buffer in a conventional HS-PDSCH decoder has a size N and a bit width X, the IR buffer 131 in the HS-PDSCH decoder in accordance with the second exemplary embodiment has a size N/2 and a bit width X/2.

Specifically, a X-bit output transmitted from the first adder 108 is stored in a X-bit position in LSB (Least Significant Bit) in an address of the IR buffer 131, and simultaneously, a X-bit output transmitted from the second adder 118 is stored in a X-bit position in MSB (Most Significant Bit) in an address of the IR buffer 131.

The first selector 104, which is in association with the first adder 108, selects one of an output transmitted from the IR buffer 131 and "0", and outputs the selected one to the first adder 108. The second selector 114, which is in association with the second adder 118, selects one of an output transmitted from the IR buffer 131 and "0", and outputs the selected one to the second adder 118.

For instance, if the received data Rx is comprised of newly transmitted packet data, the first and second selectors 104 and 114 select and output "0", in which case, the first and second adders 108 and 118 add "0" to each of outputs 105 and 115 transmitted from the second rate de-matching unit 130. Thus, the outputs 105 and 115 transmitted from the second rate de-matching unit 130 is written into the IR buffer 131 as they are for the preparation of the next combining step.

In contrast, if the received data Rx is comprised of re-transmitted packet data, the first selector 104 selects and outputs data located at a X-bit position in LSB in an address of the IR buffer 131, but not yet re-transmitted, and the second selector 114 selects and outputs packet data located at a X-bit position in MSB in an address of the IR buffer 131, but not yet re-transmitted.

The first adder 108 adds the data located at a X-bit position in LSB in an address of the IR buffer 131, but not yet re-transmitted, to the output 105 transmitted from the second rate de-matching unit 130, and the second adder 118 adds the data located at a X-bit position in MSB in an address of the IR buffer 131, but not yet re-transmitted, to the output 115 transmitted from the second rate de-matching unit 130.

The resulting data is written into the address (namely, an address at which data was read out of the IR buffer 131 prior to the addition) in the IR buffer 131 for the preparation of the next combining step.

The first input buffer 107, which is in association with the first adder 108, temporarily stores the data output from the first adder 108 for the preparation of a turbo-decoding step to be carried out in the first rate de-matching/turbo-decoding unit 133.

Similarly, the second input buffer 117, which is in association with the second adder 118, temporarily stores the data output from the second adder 118 for the preparation of a turbo-decoding step to be carried out in the first rate de-matching/turbo-decoding unit 133.

Timings at which the first and second input buffers 107 and 117 output data to the first rate de-matching/turbo-decoding unit 133 are controlled by output control signals 132 transmitted from the first rate de-matching/turbo-decoding unit 133.

The first rate de-matching/turbo-decoding unit 508 not only carries out a first rate de-matching step in which bits having been punctured in the first rate matching step in the base station are repeated into data 109 and 119 transmitted from the first and second input buffers 107 and 117, but also repeatedly carries out a turbo-decoding step, and outputs a result 134 of the decoding.

The first rate matching step is carried out bit streams of the parity 1 bits and the parity 2 bits.

Furthermore, the first rate de-matching/turbo-decoding unit 133 carries out a CRC judgment step based on the decoding result 134. A result (OK or NG) of the CRC judgment is finally reported to the base station through a transmitter (not illustrated).

The first rate de-matching/turbo-decoding unit 133 transmits the output control signals 132 to the first and second input buffers 107 and 117 in order to control timings at which the first and second input buffers 107 and 117 output data.

As explained above, the HS-PDSCH decoder in accordance with the second exemplary embodiment is designed to carry out the second rate de-matching step and the combining step in parallel, and further, simultaneously carry out the first rate de-matching step and the turbo-decoding step. Accordingly, it is possible to significantly shorten a total period of time necessary for processing received data in a HS-PDSCH decoder.

A detailed structure of the first rate de-matching/turbo-decoding unit 133 is explained hereinbelow with reference to FIGS. 3 and 4.

Figure 3:
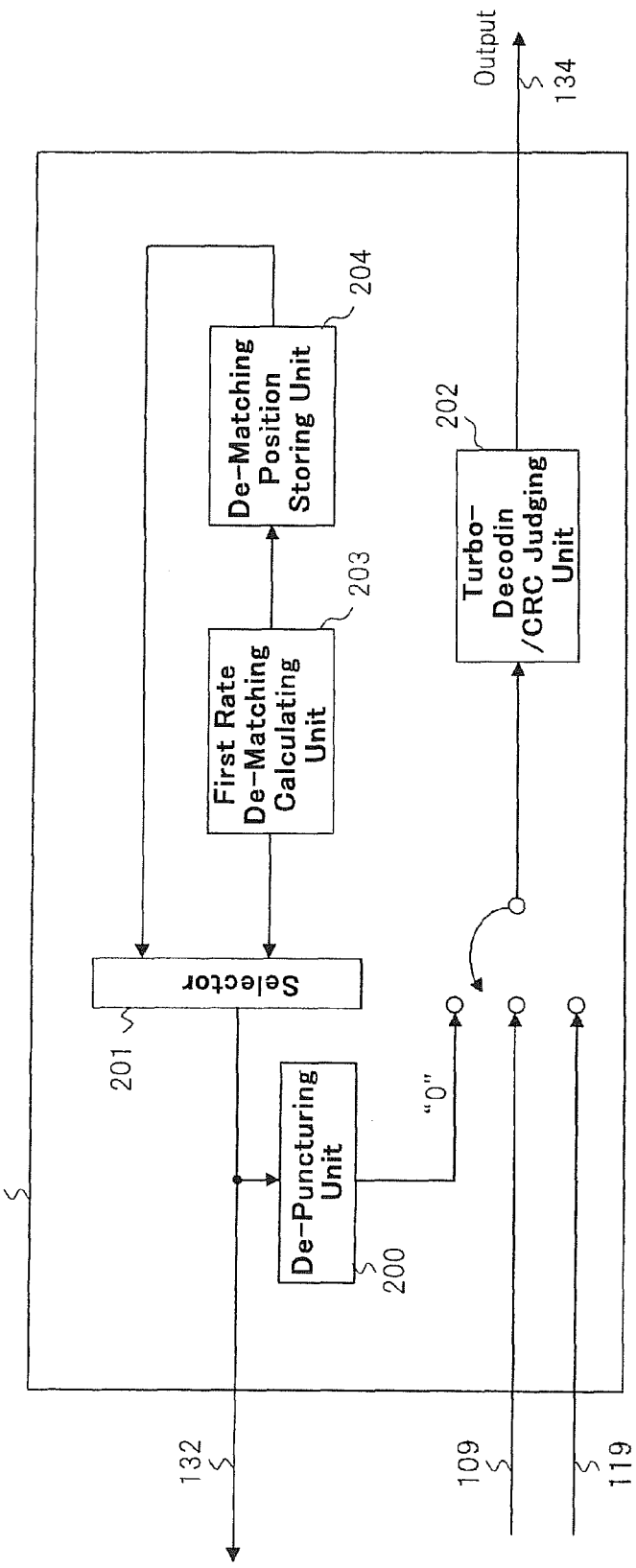
FIG. 3 is a block diagram illustrating a structure of a first rate de-matching/turbo-decoding unit in accordance with a first example in the HS-PDSCH decoder in accordance with the second exemplary embodiment of the present invention.

FIG. 3 is a block diagram of a structure of the first rate de-matching/turbo-decoding unit 133 in accordance with a first example.

With reference to FIG. 3, the first rate de-matching/turbo-decoding unit 133 in accordance with a first example is comprised of a de-puncturing unit 200, a selector 201, a turbo-decoding/CRC judging unit 202, a first rate de-matching calculating unit 203, and a de-matching position storing unit 204. The de-puncturing unit 200 outputs "0" which is to be repeated to data 109 and 119 transmitted from the first and second input buffers 107 and 117, respectively.

The de-puncturing unit 200 receives the output control signal 132 transmitted from the selector 201, and controls a timing at which a bit "0" is output, in accordance with the received output control signal 132.

The first rate de-matching calculating unit 203 calculates de-matching positions for data 109 and 119 transmitted from the first and second input buffers 107 and 117, respectively, that is, positions at which a bit "0" is to be repeated, in accordance with an error parameter used for calculation of rate de-matching, transmitted in advance to the mobile communication device from the base station.

The de-matching position storing unit 204 stores therein de-matching positions having been calculated in the first rate de-matching calculating unit 203.

The selector 201 selects an output transmitted from the first rate de-matching calculating unit 203 when a turbo-decoding step is firstly carried out (1st iteration), and selects an output transmitted from the de-matching position storing unit 204 when a turbo-decoding step is carried out secondly or later (2nd iteration).

An output transmitted from the selector 201 is input into the de-puncturing unit 200, the first input buffer 107, and the second input buffer 117 as an output control signal 132 in accordance with which data output transmitted from the first and second input buffers 107 and 117, and bit output transmitted from the de-puncturing unit 200 are controlled.

A turbo-decoding step has an algorithm of repetition. Accordingly, it is necessary in a turbo-decoding step to read data 109 and 119 out of the first and second input buffers 107 and 117, respectively, and carry out turbo-decoding to the thus read-out data.

Thus, in the first example, the data 109 and 119 are alternately output from the first and second input buffers 107 and 117 in accordance with the output control signals 132.

When a de-puncturing step has to be carried out, the first and second input buffers 107 and 117 are ceased to transmit an output signal, and the de-puncturing unit 200 is caused to transmit a bit "0" in accordance with the output control signal 132.

The turbo-decoding/CRC judging unit 202 carries out a turbo-decoding step alternately to the data 109 and 119 transmitted from the first and second input buffers 107 and 117, respectively, and, when a de-puncturing step has to be carried out, carries out a first rate de-matching step in which a bit "0" transmitted from the de-puncturing unit 200 is repeated into the data 109 and 119 at de-puncturing positions thereof.

As mentioned above, in the first example, the turbo-decoding/CRC judging unit 202 carries out not only a turbo-decoding step, but also a first rate de-matching step.

Furthermore, calculation of a de-matching position to be accomplished by the first rate de-matching calculating unit 203 is necessarily carried out only at a first turbo-decoding step, and can be omitted at a second and subsequent turbo-decoding steps.

Figure 4:
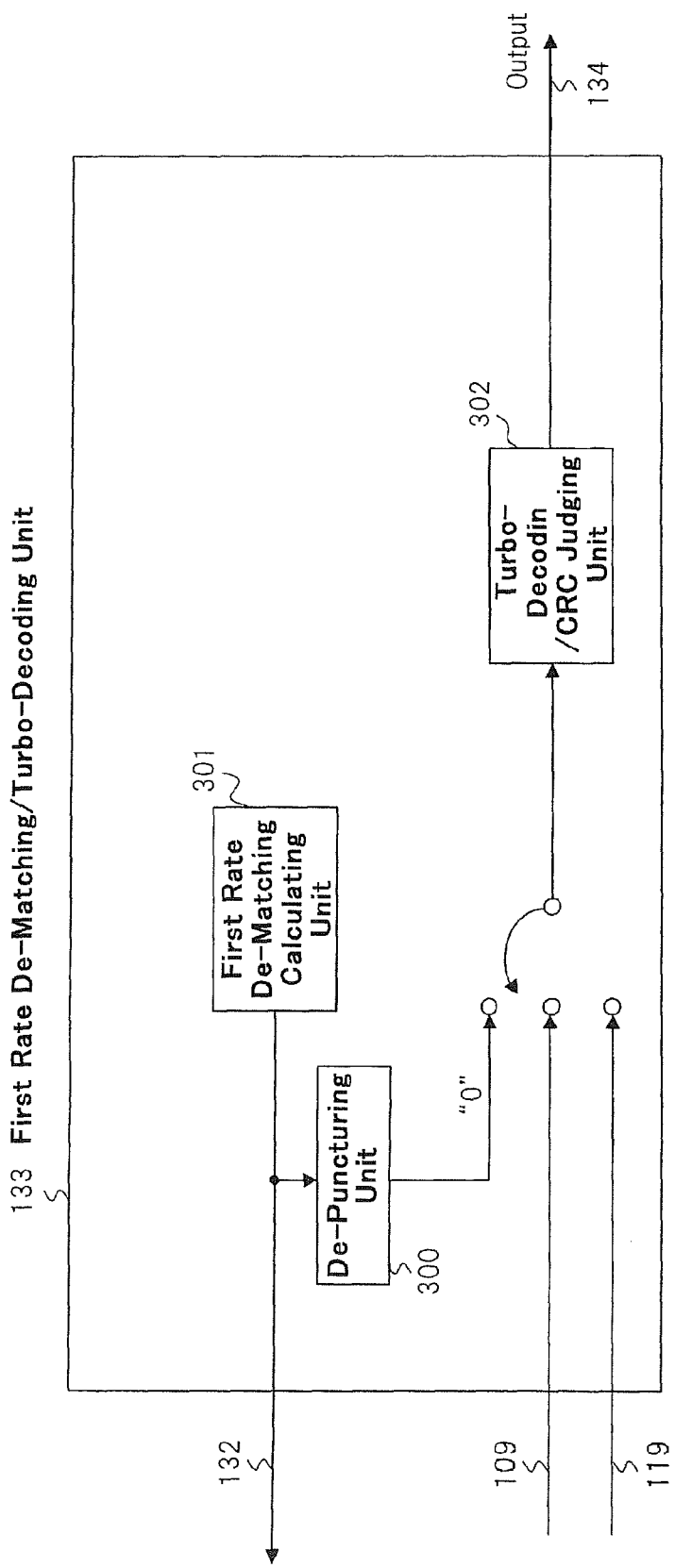
FIG. 4 is a block diagram illustrating a structure of a first rate de-matching/turbo-decoding unit in accordance with a second example in the HS-PDSCH decoder in accordance with the second exemplary embodiment of the present invention.

FIG. 4 is a block diagram of a structure of the first rate de-matching/turbo-decoding unit 133 in accordance with a second example.

With reference to FIG. 4, the first rate de-matching/turbo-decoding unit 133 in accordance with a second example is comprised of a de-puncturing unit 300, a first rate de-matching calculating unit 301, and a turbo-decoding/CRC judging unit 302.

The de-puncturing unit 300 outputs "0" which is to be repeated to data 109 and 119 transmitted from the first and second input buffers 107 and 117, respectively.

A timing at which the de-puncturing unit 300 outputs a bit "0" is controlled by an output control signal 132 transmitted from the first rate de-matching calculating unit 301.

The first rate de-matching calculating unit 301 calculates de-matching positions for data 109 and 119 transmitted from the first and second input buffers 107 and 117, respectively, that is, positions at which a bit "0" is to be repeated, in accordance with an error parameter used for calculation of rate de-matching, transmitted in advance to the mobile communication device from the base station.

An output transmitted from the first rate de-matching calculating unit 301 is input into the de-puncturing unit 300, the first input buffer 107, and the second input buffer 117 as an output control signal 132 in accordance with which data output transmitted from the first and second input buffers 107 and 117, and bit output transmitted from the de-puncturing unit 300 are controlled.

A turbo-decoding step has an algorithm of repetition. Accordingly, it is necessary in a turbo-decoding step to read data 109 and 119 out of the first and second input buffers 107 and 117, respectively, and carry out turbo-decoding to the thus read-out data.

Thus, in the second example, the data 109 and 119 are alternately output from the first and second input buffers 107 and 117 in accordance with the output control signals 132.

When a de-puncturing step has to be carried out, the first and second input buffers 107 and 117 are ceased to transmit an output signal, and the de-puncturing unit 300 is caused to transmit a bit "0" in accordance with the output control signal 132.

The turbo-decoding/CRC judging unit 302 carries out a turbo-decoding step alternately to the data 109 and 119 transmitted from the first and second input buffers 107 and 117, respectively, and, when a de-puncturing step has to be carried out, carries out a first rate de-matching step in which a bit "0" transmitted from the de-puncturing unit 300 is repeated into the data 109 and 119 at de-puncturing positions thereof.

As mentioned above, in the second example, the turbo-decoding/CRC judging unit 302 carries out not only a turbo-decoding step, but also a first rate de-matching step.

Calculation of a de-matching position to be accomplished by the first rate de-matching calculating unit 301 is necessarily carried out not only at a first turbo-decoding step, but also at a second and subsequent turbo-decoding steps.

Hereinbelow is explained an operation of the HS-PDSCH decoder in accordance with the first exemplary embodiment, illustrated in FIG. 2.

First, an operation of the HS-PDSCH decoder including the first rate de-matching/turbo-decoding unit 133 having the structure in accordance with the first example, illustrated in FIG. 3, is explained hereinbelow with reference to FIG. 5.

Figure 5:
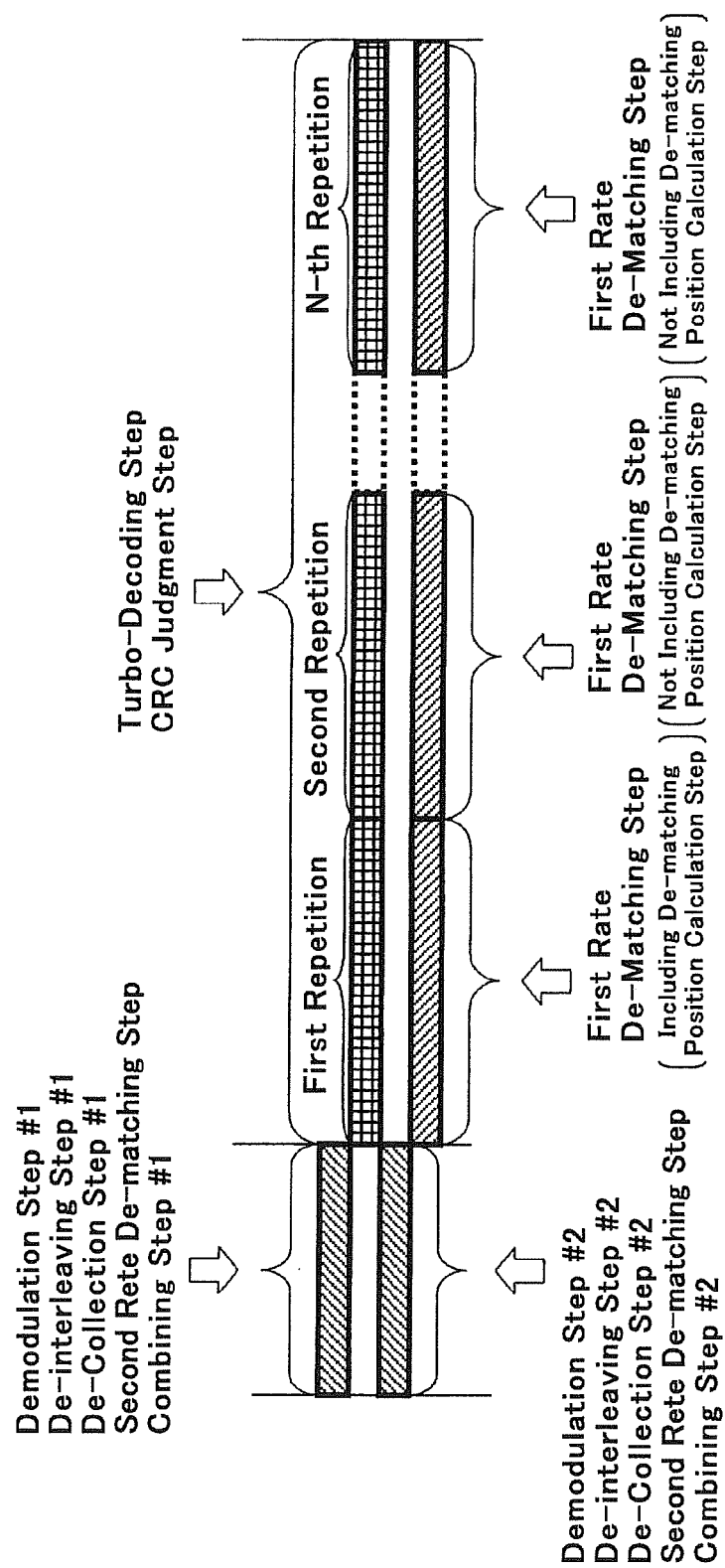
FIG. 5 illustrates an operation of the HS-PDSCH decoder in accordance with the second exemplary embodiment of the present invention, including the first rate de-matching/turbo-decoding unit illustrated in FIG. 3.

With reference to FIG. 5, a decoding step, a de-interleaving step and a de-collection step, a second rate de-matching step, and a combining step are carried out in parallel to two data defining the received data Rx in the first and second demodulators 101 and 111, the first and second de-interleaving/de-collection units 102 and 112, the second rate de-matching unit 130, and the first and second adders 108 and 118, respectively.

Accordingly, a period of time for carrying out a decoding step, a de-interleaving step, a de-collection step, a second rate de-matching step, and a combining step in the HS-PDSCH decoder in accordance with the first exemplary embodiment is shortened to about a half of the same in the conventional HS-PDSCH decoder in which the above-listed steps are carried out in non-parallel.

Then, the first rate de-matching/turbo-decoding unit 133 carries out a turbo-decoding step, and simultaneously, a first rate de-matching step in which a bit "0" is repeated into data (bit streams of the parity 1 bits and the parity 2 bits) transmitted from the first and second input buffers 107 and 117.

Thus, a period of time necessary for carrying out both a turbo-decoding step and a first rate de-matching step in the HS-PDSCH decoder in accordance with the second exemplary embodiment is significantly shortened relative to the same in the conventional HS-PDSCH decoder in which a turbo-decoding step and a first rate de-matching step are separately carried out.

In a first turbo-decoding step, a de-matching position is calculated by the first rate de-matching calculating unit 203, and a timing at which data 109 and 119 are output from the first and second input buffers 107 and 117, and a timing at which bits are output from the de-puncturing unit 200 are controlled in accordance with the calculated de-matching position. The calculated de-matching position is stored in the de-matching position storing unit 204, and a timing at which data 109 and 119 are output and a timing at which bits are output are controlled in the second and subsequent turbo-decoding steps in accordance with a de-matching position stored in the de-matching position storing unit 204. Accordingly, it is not necessary for the first rate de-matching calculating unit 203 to calculate a de-matching position in the second and subsequent turbo-decoding steps.

Hereinbelow, an operation of the HS-PDSCH decoder including the first rate de-matching/turbo-decoding unit 133 having the structure in accordance with the second example, illustrated in FIG. 4, is explained with reference to FIG. 6.

Figure 6:
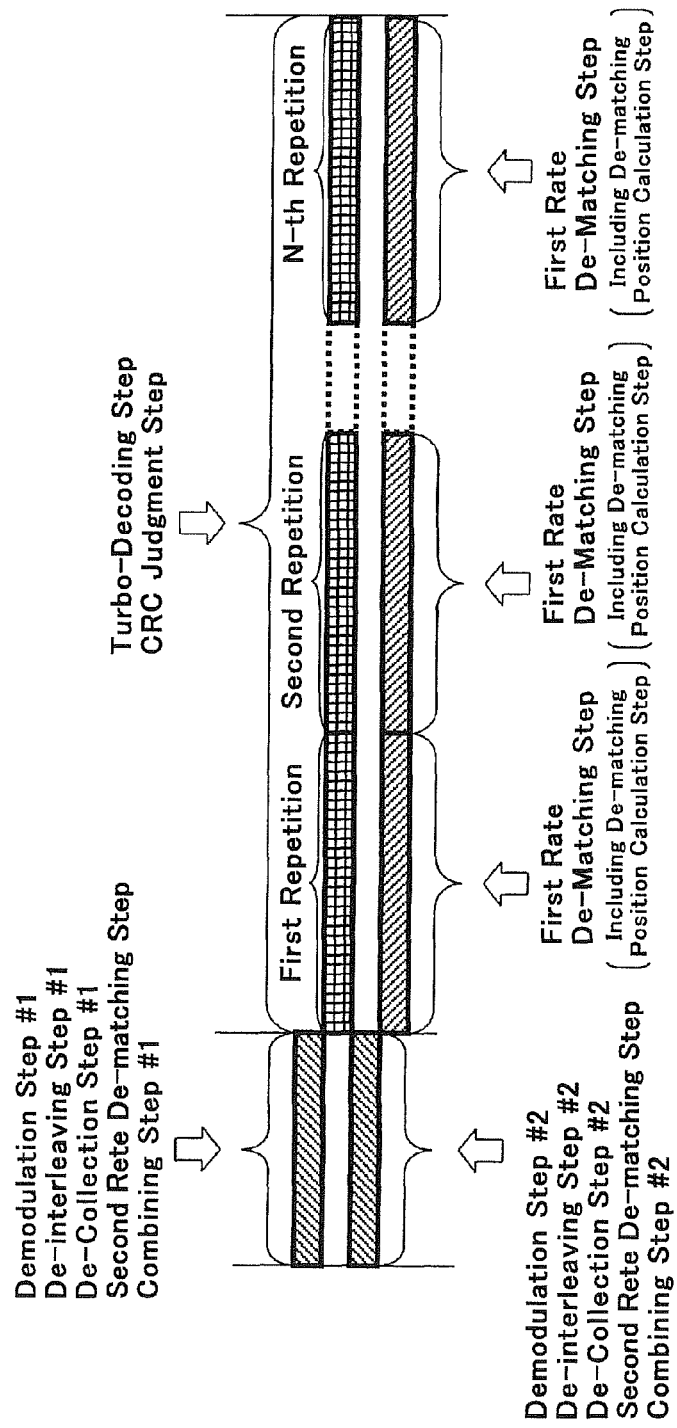
FIG. 6 illustrates an operation of the HS-PDSCH decoder in accordance with the second exemplary embodiment of the present invention, including the first rate de-matching/turbo-decoding unit illustrated in FIG. 4.

With reference to FIG. 6, a decoding step, a de-interleaving step and a de-collection step, a second rate de-matching step, and a combining step are carried out in parallel to two data defining the received data Rx in the first and second demodulators 101 and 111, the first and second de-interleaving/de-collection units 102 and 112, the second rate de-matching unit 130, and the first and second adders 108 and 118, respectively.

The above-mentioned steps are identical to the steps illustrated in FIG. 5.

Then, the first rate de-matching/turbo-decoding unit 133 carries out a turbo-decoding step, and simultaneously, a first rate de-matching step in which a bit "0" is repeated into data transmitted from the first and second input buffers 107 and 117.

It should be noted that, in the second example illustrated in FIG. 6, the first rate de-matching calculating unit 301 calculates a de-matching position not only at a first turbo-decoding step, but also at a second and subsequent turbo-decoding steps.

A structure of the HS-PDSCH decoder in accordance with the second exemplary embodiment is not to be limited to the above-mentioned structure, but may be varied in some ways.

For instance, two data are processed in parallel with each other in a second rate de-matching step and a combining step in the HS-PDSCH decoder in accordance with the second exemplary embodiment. A number of data to be processed in parallel is not to be limited to two. It is possible in the HS-PDSCH decoder in accordance with the second exemplary embodiment to process N (N indicates an integer equal to or greater than 2) data in parallel with one another.

Though the HS-PDSCH decoder in accordance with the second exemplary embodiment is designed to have both a function for carrying out a second rate de-matching step and a combining step in parallel with each other, and a function for carrying out a first rate de-matching step simultaneously with a turbo-decoding step, the HS-PDSCH decoder may be designed to have one of the functions.

Specifically, the HS-PDSCH decoder in accordance with the second exemplary embodiment may be designed to carry out a second rate de-matching step and a combining step in parallel with each other, but carry out a first rate de-matching step and a turbo-decoding step separately from each other (see a later mentioned third exemplary embodiment). As an alternative, the HS-PDSCH decoder in accordance with the second exemplary embodiment may be designed to carry out a first rate de-matching step and a turbo-decoding step simultaneously with each other, but carry out a second rate de-matching step and a combining step in non-parallel with each other (see the first exemplary embodiment).

The second rate de-matching unit 130 and the first rate de-matching/turbo-decoding unit 133 in the second exemplary embodiment may be designed to operate in accordance with a computer program written in a language readable by a computer.

Figure 7:
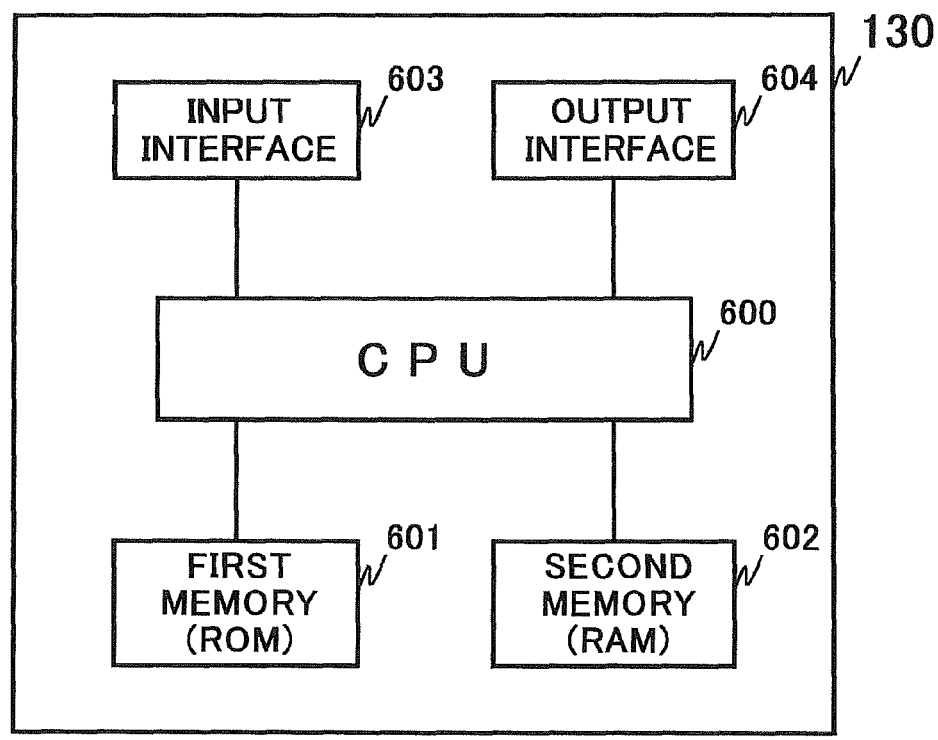
FIG. 7 is a block diagram illustrating a structure of a second rate de-matching unit in accordance with an example in the HS-PDSCH decoder in accordance with the second exemplary embodiment of the present invention.

In the case that the second rate de-matching unit 130 is operated by a computer program, the second rate de-matching unit 130 is designed to have such a structure as illustrated in FIG. 7, for instance.

The second rate de-matching unit 130 illustrated in FIG. 7 is comprised of a central processing unit (CPU) 600, a first memory 601, a second memory 602, an input interface 603 through which commands and/or data are input into the central processing unit 600, and an output interface 604 through which a result of steps having been executed by the central processing unit 600 is output.

Each of the first and second memories 601 and 602 is comprised of a semiconductor memory such as a read only memory (ROM), a random access memory (RAM) or an IC memory card, a storage device such as a flexible disc, a hard disc, or an optic magnetic disc. For instance, the first memory 601 comprises a ROM, and the second memory 602 comprises a RAM.

The first memory 601 stores therein a program for carrying out the second rate de-matching step. The second memory 602 stores therein various data and parameters, and presents a working area to the central processing unit 600. The central processing unit 600 reads the program out of the first memory 601, and executes the program. Thus, the central processing unit 600 operates in accordance with the program stored in the first memory 601.

The first rate de-matching/turbo-decoding unit 133 may be designed to have a structure similar to the second rate de-matching unit 130.

Third Exemplary Embodiment

Figure 8:
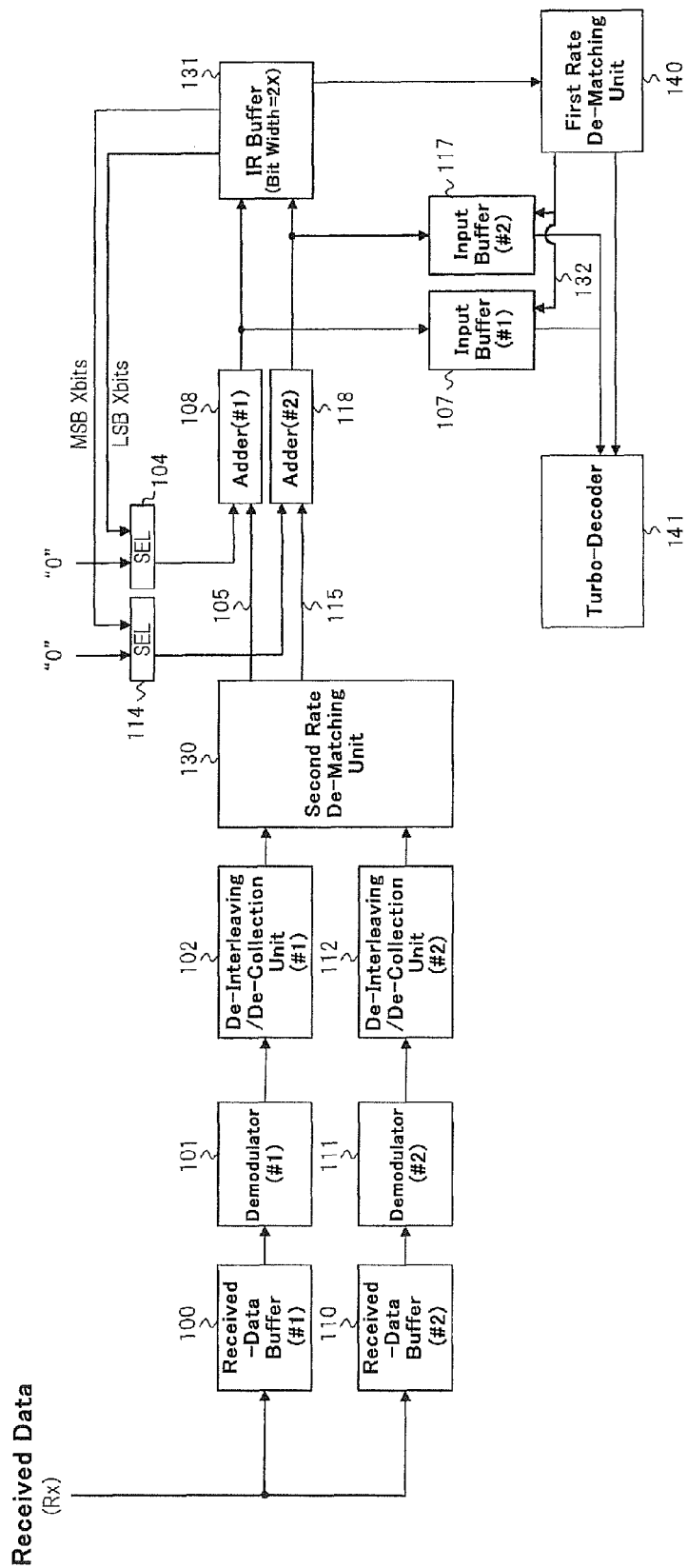
FIG. 8 is a block diagram illustrating a structure of a HS-PDSCH decoder in accordance with a third exemplary embodiment of the present invention.
Figure 9:
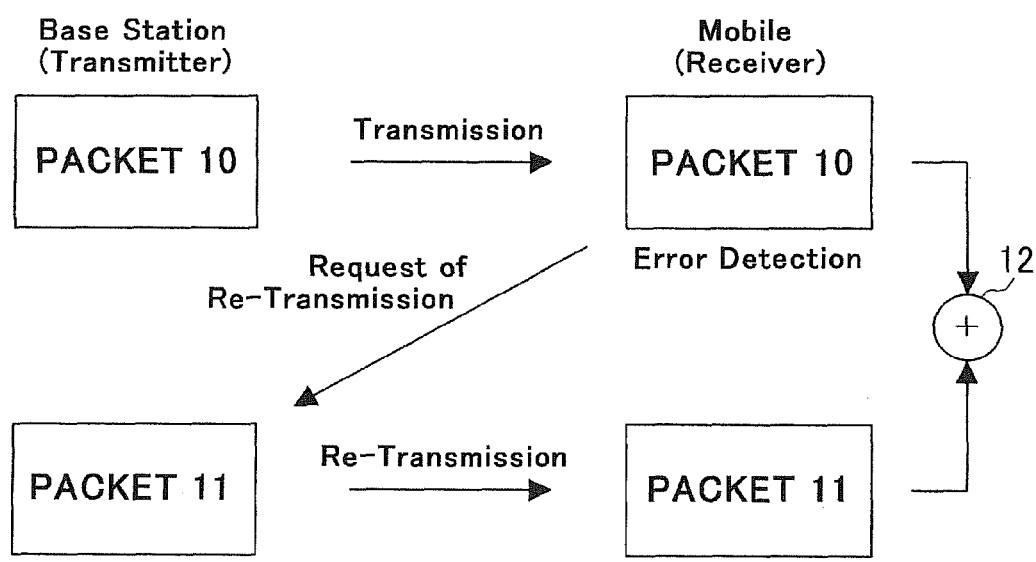
FIG. 9 is used for explaining the chase/combining step.
Figure 10:
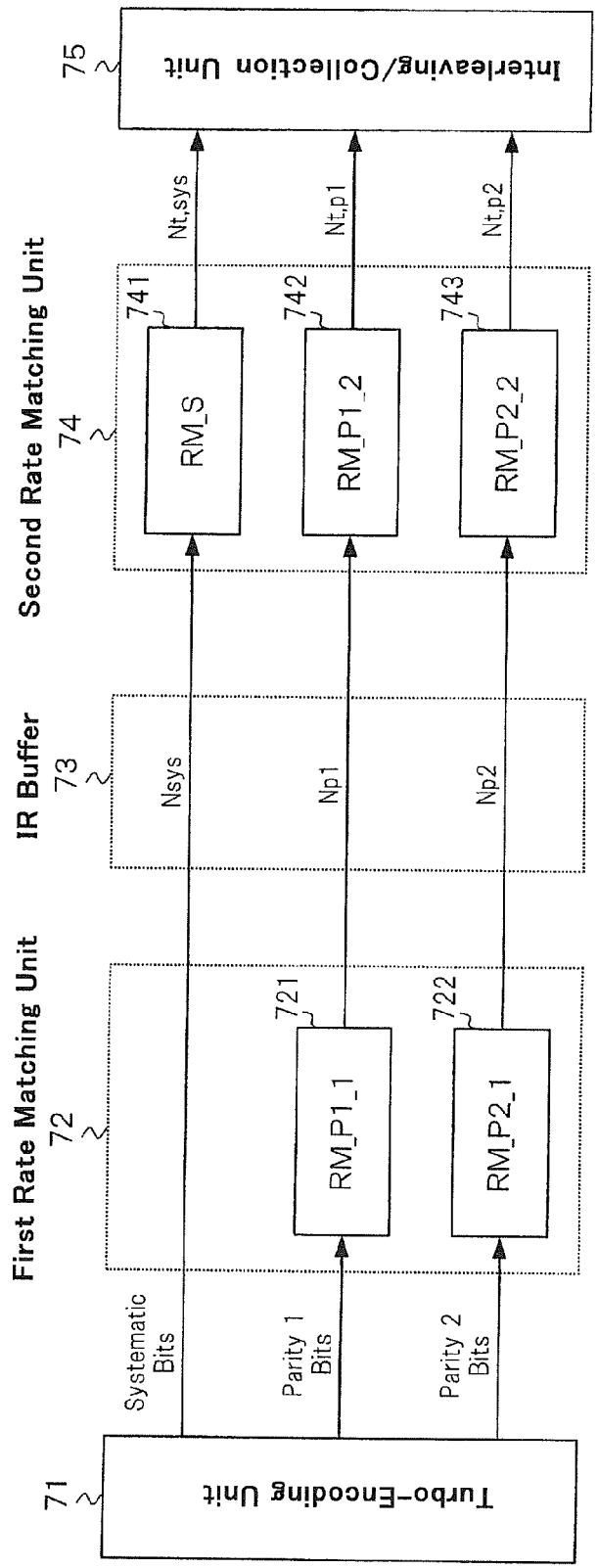
FIG. 10 is a block diagram of a base station in which a HARQ step is carried out.
Figure 11:
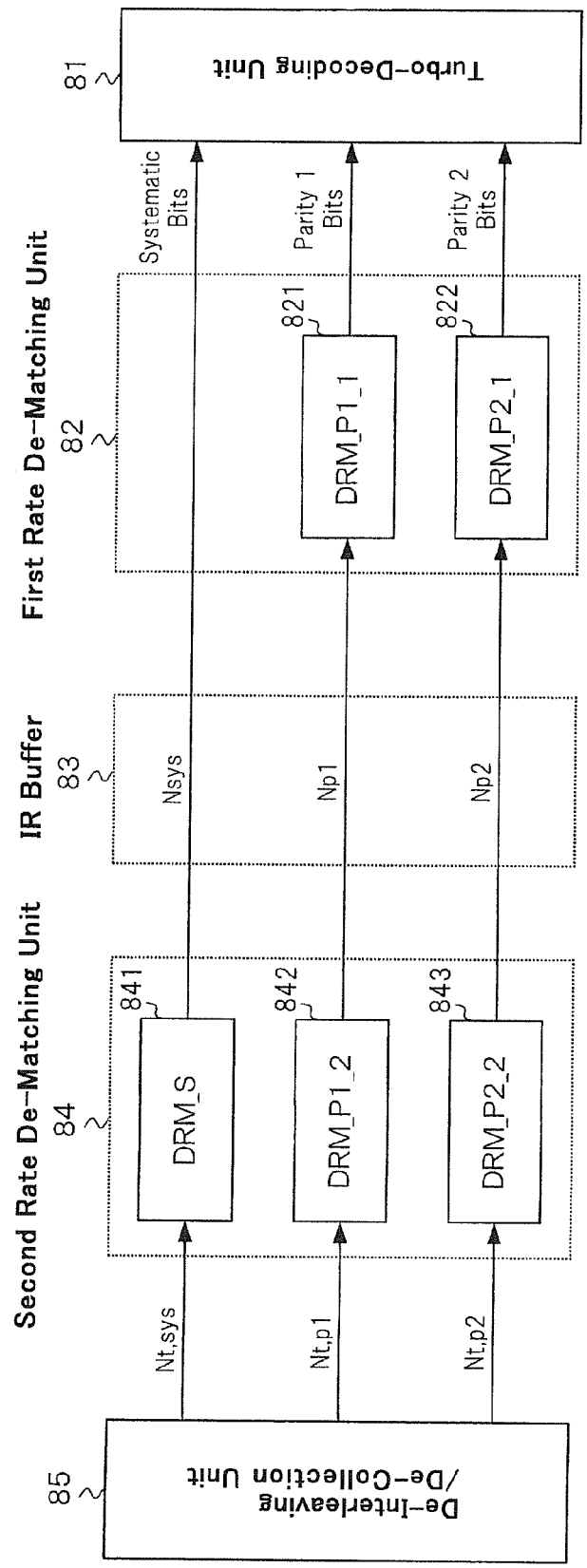
FIG. 11 is a block diagram of a mobile communication device carrying out a HARQ step.

FIG. 8 is a block diagram of a HS-PDSCH decoder in accordance with a third exemplary embodiment of the present invention.

The HS-PDSCH decoder in accordance with the current embodiment is mounted in a mobile radio-signal communication device, for instance, a mobile telephone.

As illustrated in FIG. 8, the HS-PDSCH decoder in accordance with the third exemplary embodiment is designed to include both a first rate de-matching unit 140 and a turbo-decoder 141 in place of the first rate de-matching/turbo-decoding unit 133 in comparison with the HS-PDSCH decoder in accordance with the second exemplary embodiment. The HS-PDSCH decoder in accordance with the third exemplary embodiment has the same structure as that of the HS-PDSCH decoder in accordance with the second exemplary embodiment except including both a first rate de-matching unit 140 and a turbo-decoder 141 in place of the first rate de-matching/turbo-decoding unit 133.

The first de-matching unit 140 may be designed to include, for instance, a de-puncturing unit 200, a selector 201, a first rate de-matching unit 203, and a de-matching position storing unit 204 all illustrated in FIG. 3.

The turbo-decoder 141 has the same structure as the structure of the turbo-decoding/CRC judging unit 202 illustrated in FIG. 3.

Since the HS-PDSCH decoder in accordance with the third exemplary embodiment is designed to carry out a second rate de-matching step and a combining step in parallel with each other to N data defining the received data, a period of time necessary for carrying out both a second rate de-matching step and a combining step is N times shorter than the same in a conventional HS-PDSCH in which those steps are carried out separately. Accordingly, it is possible to significantly shorten a total period of time necessary for processing received data in a HS-PDSCH decoder.

The exemplary advantages obtained by the above-mentioned exemplary embodiments are described hereinbelow.

In accordance with the present invention, there is provided an advantage that a total period of time necessary for processing received data can be significantly shortened.

Hereinbelow is explained industrial applicability of the HS-PDSCH decoder in accordance with the present invention.

The HS-PDSCH decoder in accordance with the present invention may be mounted in a mobile radio-signal communication device, for instance, a mobile phone. By mounting the HS-PDSCH decoder in accordance with the present invention in a mobile radio-signal communication device a typical example of which is a mobile phone, it would be possible to significantly shorten a period of time for processing data received by a mobile radio-signal communication device, ensuring that an efficiency at which a mobile radio-signal communication device operates can be significantly enhance.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Japanese Patent Application No. 2005-222811 filed on Aug. 1, 2005, the entire disclosure of which, including specification, claims, drawings and summary, is incorporated herein by reference in its entirety.

What is claimed is:

1. A HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a second rate de-matching unit receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step, and outputting said N data to which said second rate de-matching step was carried out;

N adders carrying out a combining step for adding predetermined data to corresponding single data in parallel among said N data having been output from said second rate de-matching unit, and outputting data to which combining step was carried out;

a first rate de-matching unit carrying out a first rate de-matching step to data having been output from said N adders for de-removing bits having been punctured in said first rate matching step, and outputting data to which said first rate de-matching step was carried out; and a decoder repeatedly carrying out a turbo-decoding step to data having been output from said first rate de-matching unit.

2. The HS-PDSCH decoder as set forth in claim 1, further comprising:

N received-data buffers for temporarily storing and outputting said received data;

N demodulators each associated with each of said N received-data buffers, each demodulating data having been output from an associated received-data buffer among said N received-data buffers, and outputting the thus demodulated data; and N de-interleaving/de-collection units each associated with each of said N demodulators, each carrying out a de-interleaving/de-collecting step to data having been output from an associated demodulator among said N demodulators, and outputting to which said de-interleaving/de-collecting step was carried out to said second rate de-matching unit.

3. The HS-PDSCH decoder as set forth in claim 1, further comprising an IR buffer temporarily storing and outputting data having been output from each of said N adders as said predetermined data to be added in a next combining step in said N adders.

4. A HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a second rate de-matching unit receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step, and outputting said N data to which said second rate de-matching step was carried out;

N adders carrying out a combining step for adding predetermined data to corresponding single data in parallel among said N data having been output from said second rate de-matching unit, and outputting data to which said combining step was carried out;

N input buffers each associated with each of said N adders, each temporarily storing and outputting data having been output from an associated adder among said N adders; and a first rate de-matching/decoding unit both carrying out a first rate de-matching step to data having been output from said N input buffers for de-removing bits having been punctured in said first rate matching step, and repeatedly carrying out a turbo-decoding step to said data having been output from said N input buffers.

5. The HS-PDSCH decoder as set forth in claim 4, wherein said first rate de-matching/decoding unit is comprised of:

a de-puncturing unit for outputting bits to be repeated into data having been output said N input buffers;

a de-matching calculating unit for calculating and outputting a de-matching position indicating a position at which bits having been output from said de-puncturing unit are repeated in a first turbo-decoding step into data having been output from said N input buffers;

a de-matching position storing unit for storing and outputting said de-matching position having been calculated by said de-matching calculating unit;

a selector for selecting an output transmitted from said de-matching calculating unit in a first turbo-decoding step and selecting an output transmitted from said de-matching position storing unit in a second or subsequent turbo-decoding step, and outputting the selected output as a control signal for controlling both a data output transmitted from said N input buffers and a bit output transmitted from said de-puncturing unit; and a turbo-decoding unit for carrying out a first rate de-matching step in which bits having been output from said de-puncturing unit are repeated into data having been output from said N input buffers, and repeatedly carrying out a turbo-decoding step.

6. The HS-PDSCH decoder as set forth in claim 4, wherein said first rate de-matching/decoding unit is comprised of:

a de-puncturing unit for outputting bits to be repeated into data having been output said N input buffers;

a de-matching calculating unit for calculating a de-matching position indicating a position at which bits having been output from said de-puncturing unit are repeated into data having been output from said N input buffers, and outputting the calculated de-matching position as a control signal for controlling both a data output transmitted from said N input buffers and a bit output transmitted from said de-puncturing unit; and a turbo-decoding unit for carrying out a first rate de-matching step in which bits having been output from said de-puncturing unit are repeated into data having been output from said N input buffers, and repeatedly carrying out a turbo-decoding step.

7. The HS-PDSCH decoder as set forth in claim 4, further comprising:

N received-data buffers for temporarily storing and outputting said received data;

N demodulators each associated with each of said N received-data buffers, each demodulating data having been output from an associated received-data buffer among said N received-data buffers, and outputting the thus demodulated data; and N de-interleaving/de-collection units each associated with each of said N demodulators, each carrying out a de-interleaving/de-collecting step to data having been output from an associated demodulator among said N demodulators, and outputting to which said de-interleaving/de-collecting step was carried out to said second rate de-matching unit.

8. The HS-PDSCH decoder as set forth in claim 4, further comprising an IR buffer temporarily storing and outputting data having been output from each of said N adders as said predetermined data to be added in a next combining step in said N adders.

9. A HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a second rate de-matching unit carrying out a second rate de-matching step to said received data for removing bits having been repeated in said second rate matching step or de-removing bits having been punctured in said second rate matching step, and outputting said received data to which said second rate de-matching step was carried out;

an adder carrying out a combining step for adding predetermined data to data having been output from said second rate de-matching unit, and outputting data to which said combining step was carried out;

an input buffer temporarily storing and outputting data having been output from said adder; and a first rate de-matching/decoding unit both carrying out a first rate de-matching step to data having been output from said input buffer for de-removing bits having been punctured in said first rate matching step, and repeatedly carrying out a turbo-decoding step to said data having been output from said input buffer.

10. The HS-PDSCH decoder as set forth in claim 9, wherein said first rate de-matching/decoding unit is comprised of:

a de-puncturing unit for outputting bits to be repeated into data having been output said input buffer;

a de-matching calculating unit for calculating and outputting a de-matching position indicating a position at which bits having been output from said de-puncturing unit are repeated in a first turbo-decoding step into data having been output from said input buffer;

a de-matching position storing unit for storing and outputting said de-matching position having been calculated by said de-matching calculating unit;

a selector for selecting an output transmitted from said de-matching calculating unit in a first turbo-decoding step and selecting an output transmitted from said de-matching position storing unit in a second or subsequent turbo-decoding step, and outputting the selected output as a control signal for controlling both a data output transmitted from said input buffer and a bit output transmitted from said de-puncturing unit; and a turbo-decoding unit for carrying out a first rate de-matching step in which bits having been output from said de-puncturing unit are repeated into data having been output from said input buffer, and repeatedly carrying out a turbo-decoding step.

11. The HS-PDSCH decoder as set forth in claim 9, wherein said first rate de-matching/decoding unit is comprised of:

a de-puncturing unit for outputting bits to be repeated into data having been output said input buffer;

a de-matching calculating unit for calculating a de-matching position indicating a position at which bits having been output from said de-puncturing unit are repeated into data having been output from said input buffer, and outputting the calculated de-matching position as a control signal for controlling both outputting said data transmitted from said input buffer and outputting said bits transmitted from said de-puncturing unit; and a turbo-decoding unit for carrying out a first rate de-matching step in which bits having been output from said de-puncturing unit are repeated into data having been output from said input buffer, and repeatedly carrying out a turbo-decoding step.

12. A mobile radio-signal communication device including a HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said HS-PDSCH decoder comprising:

a second rate de-matching unit receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step, and outputting said N data to which said second rate de-matching step was carried out;

N adders carrying out a combining step for adding predetermined data to corresponding single data in parallel among said N data having been output from said second rate de-matching unit, and outputting data to which said combining step was carried out;

a first rate de-matching unit carrying out a first rate de-matching step to data having been output from said N adders for de-removing bits having been punctured in said first rate matching step, and outputting data to which said first rate de-matching step was carried out; and a decoder repeatedly carrying out a turbo-decoding step to data having been output from said first rate de-matching unit.

13. A mobile radio-signal communication device as set forth in claim 12, wherein said mobile radio-signal communication device comprises a mobile phone.

14. A mobile radio-signal communication device including a HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said HS-PDSCH decoder comprising:

a second rate de-matching unit receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step, and outputting said N data to which said second rate de-matching step was carried out;

N adders carrying out a combining step for adding predetermined data to corresponding single data in parallel among said N data having been output from said second rate de-matching unit, and outputting data to which said combining step was carried out;

N input buffers each associated with each of said N adders, each temporarily storing and outputting data having been output from an associated adder among said N adders; and a first rate de-matching/decoding unit both carrying out a first rate de-matching step to data having been output from said N input buffers for de-removing bits having been punctured in said first rate matching step, and repeatedly carrying out a turbo-decoding step to said data having been output from said N input buffers.

15. A mobile radio-signal communication device as set forth in claim 14, wherein said mobile radio-signal communication device comprises a mobile phone.

16. A mobile radio-signal communication device including a HS-PDSCH decoder for processing received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said HS-PDSCH decoder comprising:

a second rate de-matching unit carrying out a second rate de-matching step to said received data for removing bits having been repeated in said second rate matching step or de-removing bits having been punctured in said second rate matching step, and outputting said received data to which said second rate de-matching step was carried out;

an adder carrying out a combining step for adding predetermined data to data having been output from said second rate de-matching unit, and outputting data to which said combining step was carried out;

an input buffer temporarily storing and outputting data having been output from said adder; and a first rate de-matching/decoding unit both carrying out a first rate de-matching step to data having been output from said input buffer for de-removing bits having been punctured in said first rate matching step, and repeatedly carrying out a turbo-decoding step to said data having been output from said input buffer.

17. A mobile radio-signal communication device as set forth in claim 16, wherein said mobile radio-signal communication device comprises a mobile phone.

18. A method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a first step of receiving in parallel N (N indicates an integer equal to or greater than 2) data defining said received data, and carrying out a second rate de-matching step to said N data in parallel for removing bits having been repeated in said second rate matching step or de-removing bits having been punctured in said second rate matching step;

a second step of carrying out a combining step for adding predetermined data to corresponding single data in parallel among said N data to which said second rate de-matching step was carried out;

a third step of carrying out a first rate de-matching step to data to which said combining step was carried out for de-removing bits having been punctured in said first rate matching step; and a fourth step of repeatedly carrying out a turbo-decoding step to data to which said first rate de-matching step was carried out.

19. The method as set forth in claim 18, further comprising:
dividing said received data into N data, and temporarily storing said N data;
demodulating each of said N data; and
carrying out a de-interleaving/de-collecting step to each of the thus demodulated N data.

20. A method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a first step of receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step;

a second step of carrying out a combining step for adding predetermined data to corresponding single data in parallel among said N data to which said second rate de-matching step was carried out; and a third step of both carrying out a first rate de-matching step to data to which said combining step was carried out for de-removing bits having been punctured in said first rate matching step, and repeatedly carrying out a turbo-decoding step to said data to which said combining step was carried out.

21. The method as set forth in claim 20, wherein said third step is comprised of:

a fifth step of outputting bits to be repeated into said N data to which said combining step was carried out;

a sixth step of calculating and outputting a de-matching position indicating a position at which bits having been output in said fifth step are repeated in a first turbo-decoding step into said N data;

a seventh step of storing and outputting said de-matching position having been calculated in said sixth step;

an eighth step of selecting an output transmitted in said sixth step in a first turbo-decoding step and selecting an output transmitted in said seventh step in a second or subsequent turbo-decoding step, and outputting the selected output as a control signal for controlling both outputting said N data and outputting said bits transmitted in said fifth step; and a ninth step of carrying out a first rate de-matching step in which bits having been output in said fifth step are repeated into said N data, and repeatedly carrying out a turbo-decoding step.

22. The method as set forth in claim 20, wherein said third step is comprised of:

a fifth step of outputting bits to be repeated into said N data to which said combining step was carried out;

a sixth step of calculating a de-matching position indicating a position at which bits having been output in said fifth step are repeated into said N data, and outputting the calculated de-matching position as a control signal for controlling both outputting said N data and outputting bits transmitted in said fifth step; and a seventh step of carrying out a first rate de-matching step in which bits having been output in said fifth step are repeated into said N data, and repeatedly carrying out a turbo-decoding step.

23. The method as set forth in claim 20, further comprising:
dividing said received data into N data, and temporarily storing said N data;
demodulating each of said N data; and
carrying out a de-interleaving/de-collecting step to each of the thus demodulated N data.

24. A method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, comprising:

a first step of carrying out a second rate de-matching step to said received data for removing bits having been repeated in said second rate matching step or de-removing bits having been punctured in said second rate matching step;

a second step of carrying out a combining step for adding predetermined data to data to which said second rate de-matching step was carried out; and a third step of both carrying out a first rate de-matching step to data to which said combining step was carried out for de-removing bits having been punctured in said first rate matching step, and repeatedly carrying out a turbo-decoding step to said data to which said combining step was carried out.

25. The method as set forth in claim 24, wherein said third step is comprised of:

a fifth step of outputting bits to be repeated into data to which said combining step was carried out;

a sixth step of calculating and outputting a de-matching position indicating a position at which bits having been output in said fifth step are repeated in a first turbo-decoding step into data to which said combining step was carried out;

a seventh step of storing and outputting said de-matching position;

an eighth step of selecting an output transmitted in said sixth step in a first turbo-decoding step and selecting an output transmitted in said seventh step in a second or subsequent turbo-decoding step, and outputting the selected output as a control signal for controlling both an output transmitted in said sixth step and an output transmitted in said seventh step; and a ninth step of carrying out a first rate de-matching step in which bits having been output in said sixth step are repeated into data having been output in said seventh step, and repeatedly carrying out a turbo-decoding step.

26. The method as set forth in claim 24, wherein said third step is comprised of:

a fifth step of outputting bits to be repeated into data to which said combining step was carried out;

a sixth step of calculating a de-matching position indicating a position at which bits having been output in said fifth step are repeated into data to which said combining step was carried out, and outputting the calculated de-matching position as a control signal for controlling both outputting data to which said combining step was carried out and outputting bits transmitted in said fifth step; and a seventh step of carrying out a first rate de-matching step in which bits having been output in said fifth step are repeated into data to which said combining step was carried out, and repeatedly carrying out a turbo-decoding step.

27. A computer-readable storage medium storing therein a program for causing a computer to carry out a method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said method comprising:

a first step of receiving in parallel N (N indicates an integer equal to or greater than 2) data defining said received data, and carrying out a second rate de-matching step to said N data in parallel for removing bits having been repeated in said second rate matching step or de-removing bits having been punctured in said second rate matching step;

a second step of carrying out a combining step for adding predetermined data to corresponding single data in parallel among said N data to which said second rate de-matching step was carried out;

a third step of carrying out a first rate de-matching step to data to which said combining step was carried out for de-removing bits having been punctured in said first rate matching step; and a fourth step of repeatedly carrying out a turbo-decoding step to data to which said first rate de-matching step was carried out.

28. A computer-readable storage medium storing therein a program for causing a computer to carry out a method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said method comprising:

a first step of receiving in parallel N (N indicates an integer equal to or greater than 2) data defining said received data, carrying out a second rate de-matching step to said N data in parallel for removing bits having been repeated in said second rate matching step or de-removing bits having been punctured in said second rate matching step;

a second step of carrying out a combining step for adding predetermined data to corresponding single data in parallel among said N data to which said second rate de-matching step was carried out; and a third step of both carrying out a first rate de-matching step to data to which said combining step was carried out for de-removing bits having been punctured in said first rate matching step, and repeatedly carrying out a turbo-decoding step to said data to which said combining step was carried out.

29. A computer-readable storage medium storing therein a program for causing a computer to carry out a method of dealing in a HS-PDSCH decoder with received data to which both a first rate matching step in which bits are punctured in a base station in accordance with a number of bits storable in an IR buffer of said base station, and a second rate matching step in which bits are repeated or punctured in accordance with a number of bits which can be transmitted through HS-PDSCH were carried out, said method comprising:

a first step of carrying out a second rate de-matching step to said received data for removing bits having been repeated in said second rate matching step or de-removing bits having been punctured in said second rate matching step;

a second step of carrying out a combining step for adding predetermined data to data to which said second rate de-matching step was carried out; and a third step of both carrying out a first rate de-matching step to data to which said combining step was carried out for de-removing bits having been punctured in said first rate matching step, and repeatedly carrying out a turbo-decoding step to said data to which said combining step was carried out.

* * * * *